US009340193B2

(12) United States Patent
Ganzel

(10) Patent No.: US 9,340,193 B2
(45) Date of Patent: May 17, 2016

(54) VEHICLE BRAKE SYSTEM

(71) Applicant: Kelsey-Hayes Company, Livonia, MI (US)

(72) Inventor: Blaise J. Ganzel, Ann Arbor, MI (US)

(73) Assignee: Kelsey-Hayes Company, Livonia, MI (US)

(*) Notice: Subject to any disclaimer, the term of this patent is extended or adjusted under 35 U.S.C. 154(b) by 297 days.

(21) Appl. No.: 13/844,250

(22) Filed: Mar. 15, 2013

(65) Prior Publication Data

US 2014/0131154 A1 May 15, 2014

Related U.S. Application Data

(63) Continuation-in-part of application No. PCT/US2011/057919, filed on Oct. 26, 2011, which is a continuation-in-part of application No. 12/816,010, filed on Jun. 15, 2010, now Pat. No. 8,661,812, and a
(Continued)

(51) Int. Cl.
*B60T 13/58* (2006.01)
*B60T 7/04* (2006.01)
*B60T 11/224* (2006.01)
*B60T 13/68* (2006.01)
(Continued)

(52) U.S. Cl.
CPC .................. *B60T 13/588* (2013.01); *B60T 1/10* (2013.01); *B60T 7/042* (2013.01); *B60T 8/4081* (2013.01); *B60T 11/224* (2013.01); *B60T 13/143* (2013.01); *B60T 13/686* (2013.01); *B60T 13/745* (2013.01); *B60T 8/341* (2013.01); *B60T 8/4031* (2013.01); *B60T 8/4086* (2013.01); *B60T 8/4275* (2013.01)

(58) Field of Classification Search
CPC ..... B60T 7/042; B60T 8/4081; B60T 8/4086; B60T 11/224; B60T 13/588
USPC ................... 60/552, 553, 554; 188/358, 359; 303/114.1
See application file for complete search history.

(56) References Cited

U.S. PATENT DOCUMENTS 4,802,712 A * 2/1989 Resch ............................. 60/545
7,052,094 B2 * 5/2006 Ganzel ........................... 60/548
(Continued)

FOREIGN PATENT DOCUMENTS

CN 1757551 A 4/2006
CN 1966321 A 5/2007
(Continued)

OTHER PUBLICATIONS

Search Report for the People's Republic of China, Application No. 201080006387.1 issued May 28, 2013.

*Primary Examiner* — Thomas E Lazo
(74) *Attorney, Agent, or Firm* — MacMillan, Sobanski & Todd, LLC

(57) ABSTRACT

A brake pedal unit for coupling to a brake pedal includes a housing and a pedal simulator housed within a simulation chamber formed in the housing. The pedal simulator includes a spring for providing force feedback. A first piston is mounted in the housing. The first piston is operable to generate brake actuating pressure at a first pressure output. A second piston is mounted in the housing. The first piston is operable to generate brake actuating pressure at a second pressure output. An input piston is connected to operate the pedal simulator during a normal braking mode, and wherein the input piston is coupled to actuate the first and second pistons during a manual push-though mode.

18 Claims, 15 Drawing Sheets

Related U.S. Application Data continuation-in-part of application No. 13/147,683, filed as application No. PCT/US2010/023121 on Feb. 3, 2010, now Pat. No. 9,016,805.

(60) Provisional application No. 61/702,964, filed on Sep. 19, 2012, provisional application No. 61/406,730, filed on Oct. 26, 2010, provisional application No. 61/294,678, filed on Jan. 13, 2010, provisional application No. 61/149,526, filed on Feb. 3, 2009.

(51) Int. Cl.
| | | |
|---|---|---|
| *B60T 1/10* | (2006.01) | |
| *B60T 13/14* | (2006.01) | |
| *B60T 13/74* | (2006.01) | |
| *B60T 8/34* | (2006.01) | |
| *B60T 8/40* | (2006.01) | |
| *B60T 8/42* | (2006.01) | |

(56) References Cited

U.S. PATENT DOCUMENTS

| | | | |
|---|---|---|---|
| 8,061,786 B2* | 11/2011 | Drumm et al. | 60/579 |
| 2004/0004394 A1 | 1/2004 | Ganzel | |
| 2007/0114842 A1 | 5/2007 | Ohkubo et al. | |
| 2008/0258546 A1* | 10/2008 | Drumm et al. | 303/115.4 |

FOREIGN PATENT DOCUMENTS

| | | |
|---|---|---|
| WO | 2005108179 A1 | 11/2005 |
| WO | 2007005571 A2 | 1/2007 |

\* cited by examiner

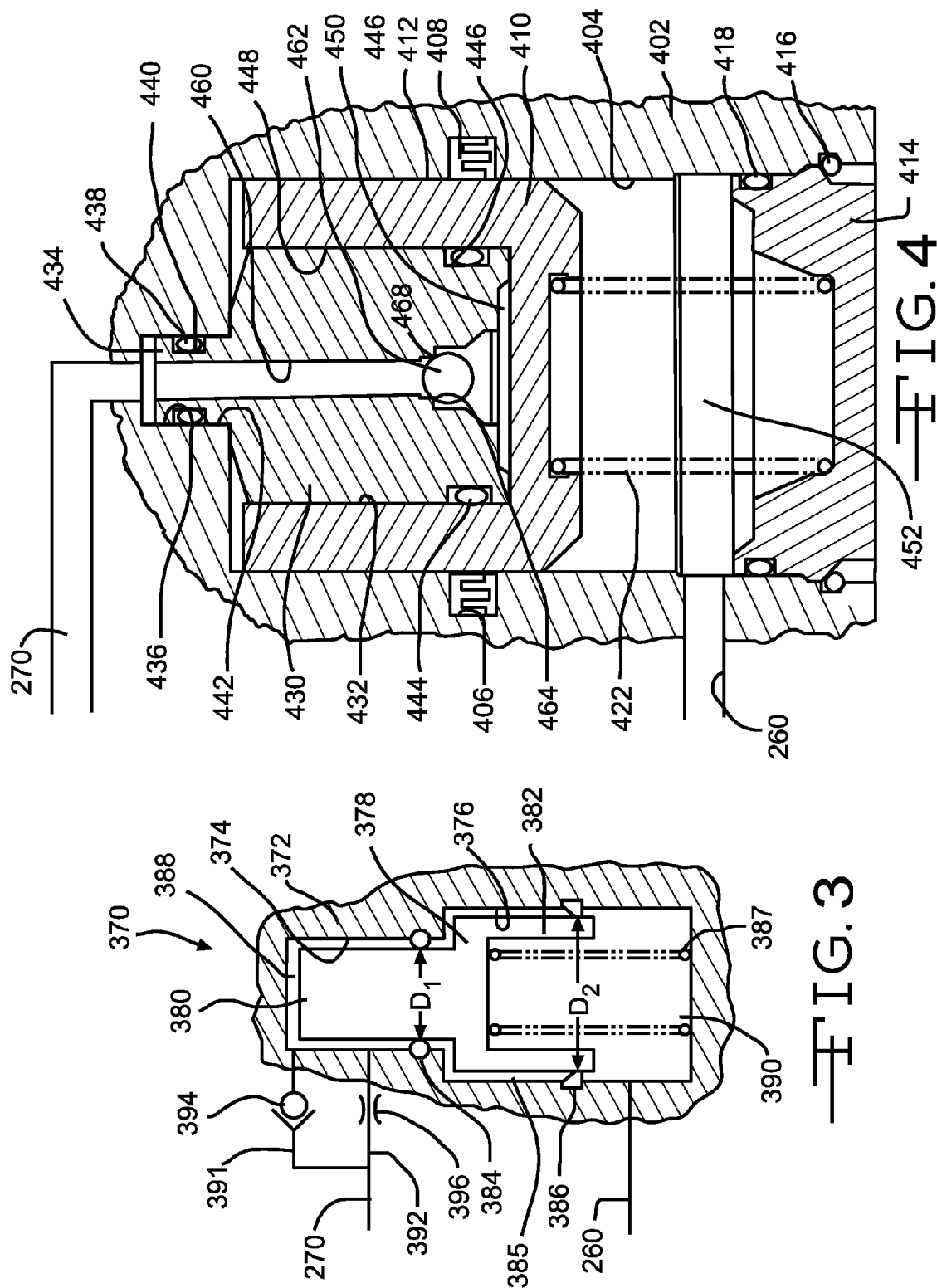

VEHICLE BRAKE SYSTEM

CROSS-REFERENCE TO RELATED APPLICATIONS

This application claims the benefit of U.S. Provisional Application No. 61/702,964, filed Sep. 19, 2012; and is a continuation-in-part of International Application No. PCT/US2011/057919, filed Oct. 26, 2011, which claims priority from U.S. Provisional Application No. 61/406,730, filed Oct. 26, 2010; and is a continuation in part of U.S. patent application Ser. No. 12/816,010, filed Jun. 15, 2010, which claims priority to International Application No. PCT/US10/23121; and is a continuation-in-part of U.S. patent application Ser. No. 13/147,683, filed Aug. 3, 2011, which is the National Phase Application of International Application No. PCT/US10/23121, filed Feb. 3, 2010; which claims priority to U.S. Provisional Application No. 61/294,678 filed Jan. 13, 2010 and U.S. Provisional Application No. 61/149,526, filed Feb. 3, 2009. The disclosures of these applications are incorporated by reference in their entirety.

BACKGROUND OF THE INVENTION

This invention relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Brake systems may also be used for regenerative braking to recapture energy. An electromagnetic force of an electric motor/generator is used in regenerative braking for providing a portion of the braking torque to the vehicle to meet the braking needs of the vehicle. A control module in the brake system communicates with a powertrain control module to provide coordinated braking during regenerative braking as well as braking for wheel lock and skid conditions. For example, as the operator of the vehicle begins to brake during regenerative braking, electromagnet energy of the motor/generator will be used to apply braking torque (i.e., electromagnetic resistance for providing torque to the powertrain) to the vehicle. If it is determined that there is no longer a sufficient amount of storage means to store energy recovered from the regenerative braking or if the regenerative braking cannot meet the demands of the operator, hydraulic braking will be activated to complete all or part of the braking action demanded by the operator. Preferably, the hydraulic braking operates in a regenerative brake blending manner so that the blending is effectively and unnoticeably picked up where the electromagnetic braking left off. It is desired that the vehicle movement should have a smooth transitional change to the hydraulic braking such that the changeover goes unnoticed by the driver of the vehicle.

Some braking systems are configured such that the pressures at each of the wheel brakes can be controlled independently (referred to as a multiplexing operation) from one another even though the brake system may includes a single source of pressure. Thus, valves downstream of the pressure source are controlled between their open and closed positions to provide different braking pressures within the wheel brakes. Such multiplex systems, which are all incorporated by reference herein, are disclosed in U.S. Pat. No. 8,038,229, U.S. Patent Application Publication No. 2010/0026083, U.S. Patent Application Publication No. 2012/0013173, and U.S. Patent Application Publication No. 2012/0306261.

SUMMARY OF THE INVENTION

This invention relates to vehicle brake systems, and in particular, to a brake pedal unit for coupling to a brake pedal includes a housing and a pedal simulator housed within a simulation chamber formed in the housing. The pedal simulator includes a spring for providing force feedback. A first piston is mounted in the housing. The first piston is operable to generate brake actuating pressure at a first pressure output. A second piston is mounted in the housing. The first piston is operable to generate brake actuating pressure at a second pressure output. An input piston is connected to operate the pedal simulator during a normal braking mode, and wherein the input piston is coupled to actuate the first and second pistons during a manual push-though mode.

Various aspects of this invention will become apparent to those skilled in the art from the following detailed description of the preferred embodiment, when read in light of the accompanying drawings.

BRIEF DESCRIPTION OF THE DRAWINGS

FIG. 3 is an enlarged schematic cross-sectional view of the intensifier of FIG. 1.

FIG. 4 is a cross-sectional view of an alternate embodiment of an intensifier.

DETAILED DESCRIPTION OF THE PREFERRED EMBODIMENTS

Figure 1:
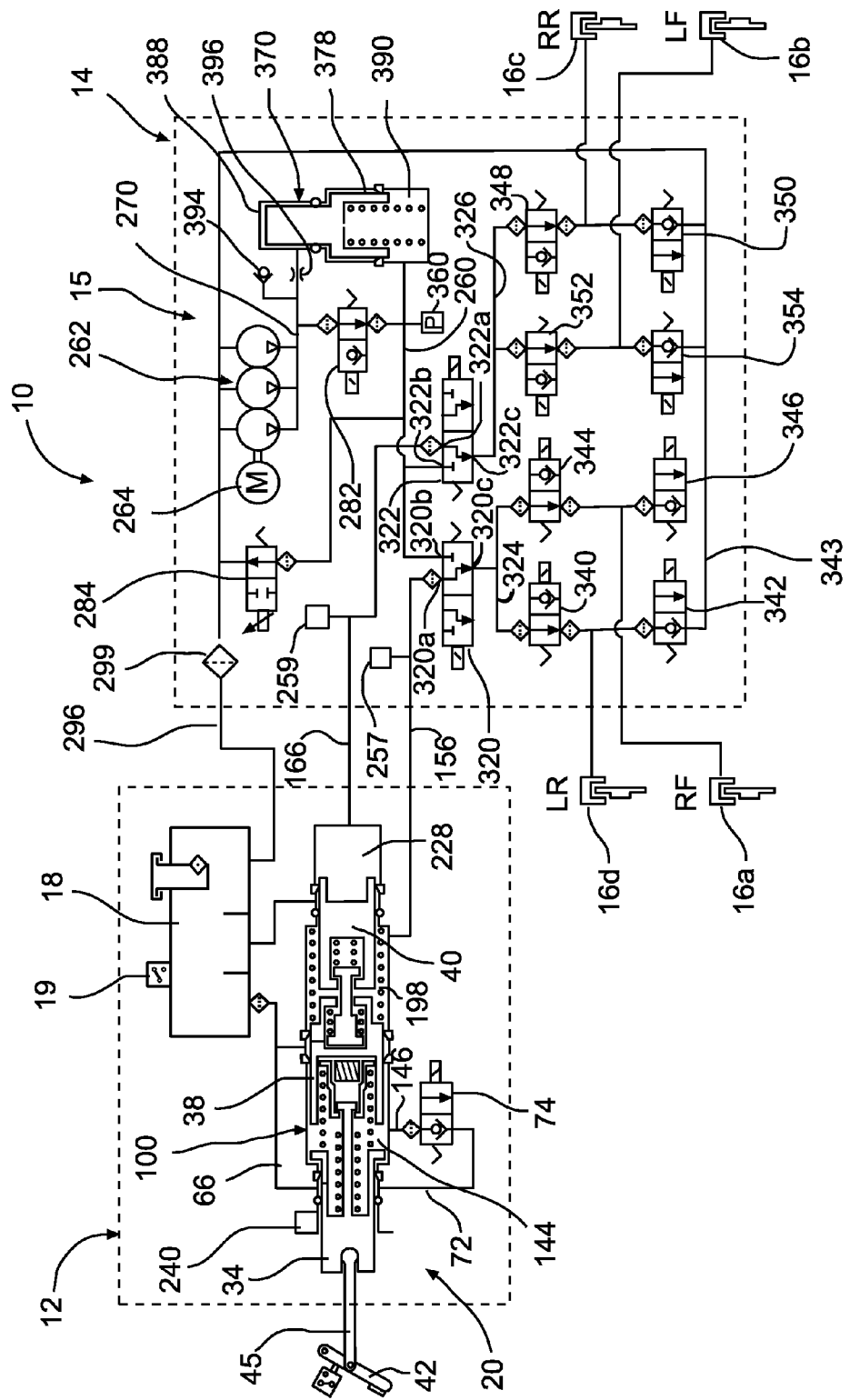
FIG. 1 is a schematic illustration of a first embodiment of a brake system.

Referring now to the drawings, there is schematically illustrated in FIG. 1 a first embodiment of a vehicle brake system, indicated generally at 10. The brake system 10 is a hydraulic boost braking system in which boosted fluid pressure is utilized to apply braking forces for the brake system 10. The brake system 10 may suitably be used on a ground vehicle such as an automotive vehicle having four wheels with a wheel brake associated with each wheel. Furthermore, the brake system 10 can be provided with other braking functions such as anti-lock braking (ABS) and other slip control features to effectively brake the vehicle, as will be discussed below.

The brake system 10 generally includes a first block or brake pedal unit assembly, indicated by broken lines 12, and a second block or hydraulic control unit, indicated by broken lines 14. The various components of the brake system 10 are housed in the brake pedal unit assembly 12 and the hydraulic control unit 14. The brake pedal unit assembly 12 and the hydraulic control unit 14 may include one or more blocks or housings made from a solid material, such as aluminum, that has been drilled, machined, or otherwise formed to house the various components. Fluid conduits may also be formed in the housings to provide fluid passageways between the various components. The housings of the brake pedal unit assembly 12 and the hydraulic control unit 14 may be single structures or may be made of two or more parts assembled together. As schematically shown, the hydraulic control unit 14 is located remotely from the brake pedal unit assembly 12 with hydraulic lines hydraulically coupling the brake pedal unit assembly 12 and the hydraulic control unit 14. Alternatively, the brake pedal unit assembly 12 and the hydraulic control unit 14 may be housed in a single housing. It should also be understood that the grouping of components as illustrated in FIG. 1 is not intended to be limiting and any number of components may be housed in either of the housings.

The brake pedal unit assembly 12 cooperatively acts with the hydraulic control unit 14 for actuating wheel brakes 16a, 16b, 16c, and 16d. The wheel brakes 16a, 16b, 16c, and 16d can be any suitable wheel brake structure operated by the application of pressurized brake fluid. The wheel brake 16a, 16b, 16c, and 16d may include, for example, a brake caliper mounted on the vehicle to engage a frictional element (such as a brake disc) that rotates with a vehicle wheel to effect braking of the associated vehicle wheel. The wheel brakes 16a, 16b, 16c, and 16d can be associated with any combination of front and rear wheels of the vehicle in which the brake system 10 is installed. For example, for a vertically split system, the wheel brakes 16a and 16d may be associated with the wheels on the same axle. For a diagonally split brake system, the wheel brakes 16*a* and 16*b* may be associated with the front wheel brakes.

The brake pedal unit assembly 12 includes a fluid reservoir 18 for storing and holding hydraulic fluid for the brake system 10. The fluid within the reservoir 18 may be held generally at atmospheric pressure or can store the fluid at other pressures if so desired. The brake system 10 may include a fluid level sensor 19 for detecting the fluid level of the reservoir. The fluid level sensor 19 may be helpful in determining whether a leak has occurred in the system 10.

The brake pedal control unit assembly 12 includes a brake pedal unit (BPU), indicated generally at 20. The brake pedal unit 20 is also schematically shown enlarged in FIG. 2. It should be understood that the structural details of the components of the brake pedal unit 20 illustrate only one example of a brake pedal unit 20. The brake pedal unit 20 could be configured differently having different components than that shown in FIGS. 1 and 2.

The brake pedal unit 20 includes a housing 24 (shown broken away in FIG. 2) having various bores formed in for slidably receiving various cylindrical pistons and other components therein. The housing 24 may be formed as a single unit or include two or more separately formed portions coupled together. The housing 24 generally includes a first bore 26, a second bore 28, and a third bore 30. The second bore 28 has a larger diameter than the first bore 26 and the third bore 30. The brake pedal unit 20 further includes an input piston 34, a primary piston 38, and a secondary piston 40. The input piston 34 is slidably disposed in the first bore 26. The primary piston 38 is slidably disposed in the second bore 28. The secondary piston 40 is slidably disposed in the third bore 30.

Figure 2:
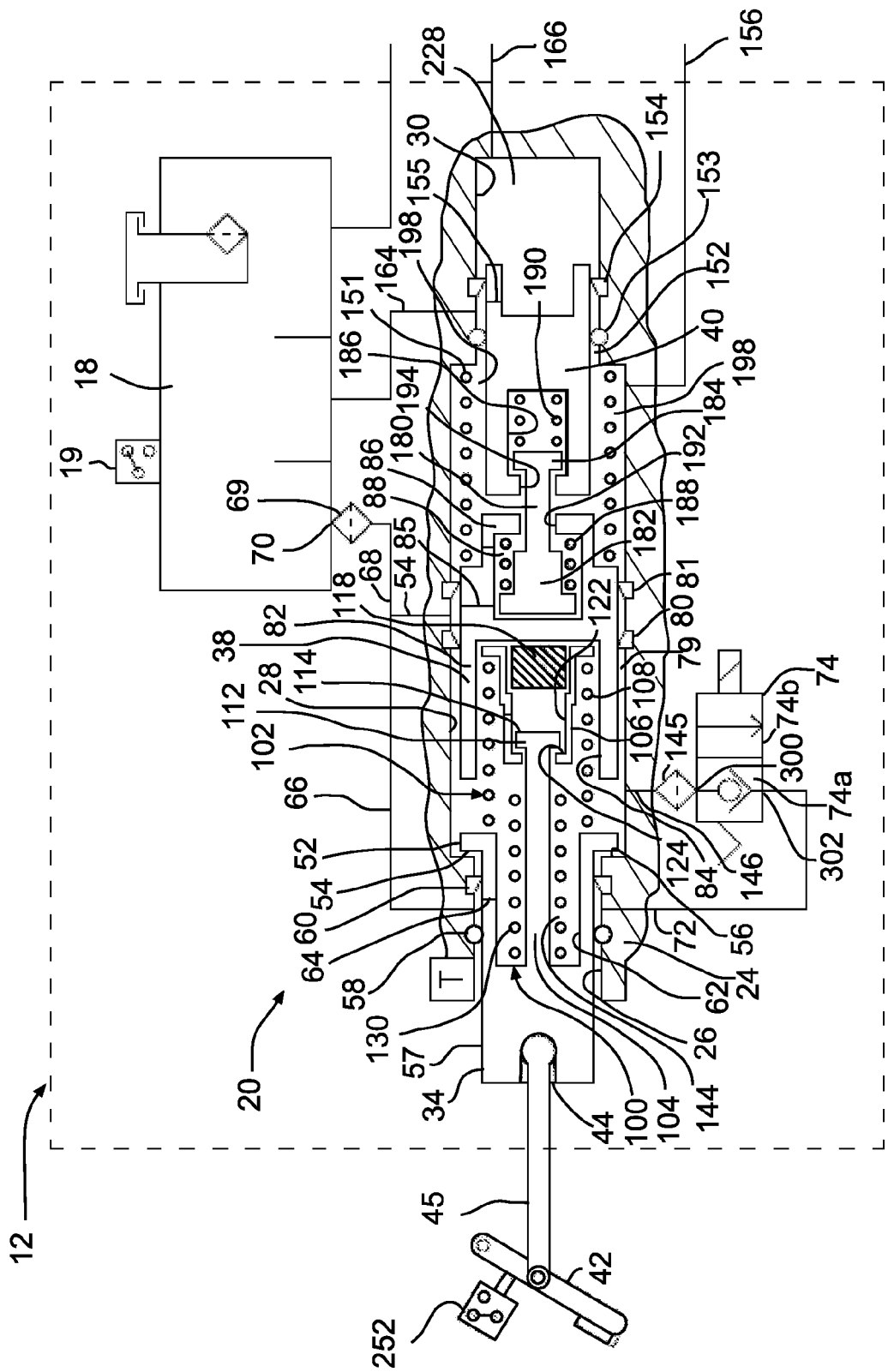
FIG. 2 is an enlarged schematic sectional view of a brake pedal unit assembly of the brake system of FIG. 1 shown in its rest position.

A brake pedal, indicated schematically at 42 in FIGS. 1 and 2, is coupled to a first end 44 of the input piston 34 via an input rod 45. The input rod 45 can be coupled directly to the input piston 34 or can be indirectly connected through a coupler (not shown). The input piston 34 includes an enlarged second end 52 that defines a shoulder 54. In the rest position shown in FIGS. 1 and 2, the shoulder 54 of the input piston engages with a shoulder 56 formed between the first and second bores 26 and 28 of the housing 24. An outer cylindrical surface 57 of the input piston 34 is engaged with a seal 58 and a lip seal 60 mounted in grooves formed in the housing 24. The outer cylindrical surface 57 may be continuous along its length or it may be stepped having two or more different diameter portions. The input piston 34 includes a central bore 62 formed through the second end 52. One or more lateral passageways 64 are formed through the input piston 34. The lateral passageways 64 extend from the outer cylindrical surface 57 to the central bore 62 to provide fluid communication therebetween. The brake pedal unit 20 is in a "rest" position as shown in FIGS. 1 and 2. In the "rest" position, the pedal 42 has not been depressed by the driver of the vehicle. In the rest position, the passageways 64 of the input piston 34 are between the seals 58 and 60. In this position, the passageways 64 are in fluid communication with a conduit 66 formed though the housing 24. The conduit 66 is in fluid communication with a conduit 68 formed in the housing 24. The conduit 68 is in fluid communication with a reservoir port 70 connected to the reservoir 18. A filter 69 may be disposed in the port 70 or the conduit 68. The conduits 66 and 68 can be formed by various bores, grooves and passageways formed in the housing 24. In the rest position, the passageways 64 are also in fluid communication with a conduit 72 formed in the housing 24 which leads to a simulation valve 74. The simulation valve 74 may be a cut off valve which may be electrically operated. The simulation valve 74 may be mounted in the housing 24 or may be remotely located therefrom The primary piston 38 is slidably disposed in the second bore 28 of the housing 24. An outer wall 79 of the primary piston 38 is engaged with a lip seal 80 and a lip seal 81 mounted in grooves formed in the housing 24. The primary piston 38 includes a first end 82 having a cavity 84 formed therein. A second end 86 of the primary piston 38 includes a cavity 88 formed therein. One or more passageways 85 are formed in the primary piston 38 which extend from the cavity 88 to the outer wall of the primary piston 38. As shown in FIG. 2, the passageway 85 is located between the lip seals 80 and 81 when the primary piston 38 is in its rest position. For reasons which will be explained below, the passageway 85 is in selective fluid communication with a conduit 154 which is in fluid communication with the reservoir 18.

The central bore 62 of the input piston 34 and the cavity 84 of the primary piston 38 house various components defining a pedal simulator, indicated generally at 100. A caged spring assembly, indicated generally at 102, is defined by a pin 104, a retainer 106, and a low rate simulator spring 108. The pin 104 is shown schematically as being part of the input piston 34 and disposed in the central bore 62. The pin 104 could be configured as a pin having a first end which is press fit or threadably engaged with the input piston 34. The pin 104 extends axially within the central bore 62 and into the cavity 84 of the primary piston 38. A second end 112 of the pin 104 includes a circular flange 114 extending radially outwardly therefrom. The second end 112 is spaced from an elastomeric pad 118 disposed in the cavity 84. The elastomeric pad 118 is axially aligned with the second end 112 of the pin 104, the reason for which will be explained below. The retainer 106 of the caged spring assembly 102 includes a stepped through bore 122. The stepped through bore 122 defines a shoulder 124. The second end 112 of the pin 104 extends through the through bore 122. The flange 114 of the pin 104 engages with the shoulder 124 of the retainer 106 to prevent the pin 104 and the retainer 106 from separating from each other. One end of the low rate simulator spring 108 engages with the second end 52 of the input piston 34, and the other end of the low rate simulator spring 108 engages with the retainer 106 to bias the retainer 106 in a direction away from the pin 104.

The pedal simulator 100 further includes a high rate simulator spring 130 which is disposed about the pin 104. The terms low rate and high rate are used for description purposes and are not intended to be limiting. It should be understood that that the various springs of the pedal simulator 100 may have any suitable spring coefficient or spring rate. In the illustrated embodiment, the high rate simulator spring 130 preferably has a higher spring rate than the low rate simulator spring 108. One end of the high rate simulator spring 130 engages with the bottom of the central bore 62 of the input piston 34. The other end of the high rate simulator spring 130 is shown in FIG. 2 in a non-engaged position and spaced away from an end of the retainer 106. The housing 24, the input piston 34 (and its seals), and the primary piston 38 (and its seals) generally define a fluid simulation chamber 144. The simulation chamber 144 is in fluid communication with a conduit 146 which is in fluid communication with the simulation valve 74. A filter 145 may be housed within the conduit 146.

As discussed above, the brake pedal unit 20 includes the primary and secondary pistons 38 and 40 that are disposed in the second and third bores 28 and 32, respectively, which are formed in the housing 24. The primary and secondary pistons 38 and 40 are generally coaxial with one another. A primary output conduit 156 is formed in the housing 24 and is in fluid communication with the second bore 28. The primary output conduit 156 may be extended via external piping or a hose connected to the housing 24. A secondary output conduit 166 is formed in the housing 24 and is in fluid communication with the third bore 30. The secondary output conduit 166 may be extended via external piping or a hose connected to the housing 24. As will be discussed in detail below, rightward movement of the primary and secondary pistons 38 and 40, as viewing FIGS. 1 and 2, provides pressurized fluid out through the conduits 156 and 166, respectively. A return spring 151 is housed in the second bore 28 and biases the primary piston 38 in the leftward direction.

The secondary piston 40 is slidably disposed in the third bore 30. An outer wall 152 of the secondary piston is engaged with a lip seal 153 and a lip seal 154 mounted in grooves formed in the housing 24. A secondary pressure chamber 228 is generally defined by the third bore 30, the secondary piston 40, and the lip seal 154. Rightward movement of the secondary piston 40, as viewing FIGS. 1 and 2, causes a buildup of pressure in the secondary pressure chamber 228. The secondary pressure chamber 228 is in fluid communication with the secondary output conduit 166 such that pressurized fluid is selectively provided to the hydraulic control unit 14. One or more passageways 155 are formed in the secondary piston 40. The passageway 155 extends between the outer wall of the primary piston 38 and a right-hand end of the secondary piston 40. As shown in FIG. 2, the passageway 155 is located between the seal 153 and the lip seal 154 when the secondary piston 40 is in its rest position, the reason for which will be explained below. For reasons which will be explained below, the passageway 155 is in selective fluid communication with a conduit 164 which is in fluid communication with the reservoir 18.

A primary pressure chamber 198 is generally defined by the second bore 28, the primary piston 38, the secondary piston 40, the lip seal 81, and the seal 153. Although the various seals shown in the drawings are schematically represented as O-ring or lip seals, it should be understood that they can have any configuration. Rightward movement of the primary piston 38, as viewing FIGS. 1 and 2, causes a buildup of pressure in the primary pressure chamber 198. The primary pressure chamber 198 is in fluid communication with the primary output conduit 156 such that pressurized fluid is selectively provided to the hydraulic control unit 14.

The primary and secondary pistons 38 and 40 may be mechanically connected together such that there is limited play or movement between the pistons 38 and 40. This type of connection permits the primary and secondary pistons 38 and 40 to move relative to one another by relatively small increments to compensate for pressure and/or volume differences in their respective output circuits. However, under certain failure modes it is desirable that the secondary piston 40 is connected to the primary piston 38. For example, if the brake system 10 is under a manual push through mode, as will be explained in detail below, and additionally fluid pressure is lost in the output circuit relative to the secondary piston 40, such as for example, in the conduit 166, the secondary piston 40 will be force or biased in the rightward direction due to the pressure within the primary chamber 1798. If the primary and secondary pistons 38 and 40 were not connected together, the secondary piston 40 would freely travel to its further most right-hand position, as viewing FIGS. 1 and 2, and the driver would have to depress the pedal 42 a distance to compensate for this loss in travel. However, because the primary and secondary pistons 38 and 40 are connected together, the secondary piston 40 is prevented from this movement and relatively little loss of travel occurs in this type of failure.

The primary and secondary pistons 38 and 40 can be connected together by any suitable manner. For example, as schematically shown in FIGS. 1 and 2, a locking member 180 is disposed and trapped between the primary and secondary pistons 38 and 40. The locking member 180 includes a first end 182 and a second end 184. The first end 182 is trapped within the cavity 88 of the second end 86 of the primary piston 38. The second end 184 of the locking member 180 is trapped within a recess or cavity 186 formed in the secondary piston 40. The first and second ends 182 and 184 may include enlarged head portions which are trapped behind narrower openings 192 and 194 of the cavities 88 and 186, respectively. A first spring 188 is housed within the cavity 88 of the primary piston 38 and biases the locking member 180 in a direction towards the primary piston 38 and away from the secondary piston 40. A second spring 190 is housed within the cavity 186 of the secondary piston 40 and biases the locking member 180 in a direction towards the primary piston 38 and away from the secondary piston 40. The springs 188 and 190 and the locking member 180 maintain the first and second output piston at a spaced apart distance from one another while permitting limited movement towards and away from each other by compression of the springs 188 or 190. This limited play mechanical connection permits the primary and secondary pistons 38 and 40 to move relative to one another by small increments to compensate for pressure and/or volume differences in their respective output circuits.

Referring back to FIG. 1, the system 10 may further include a travel sensor, schematically shown at 240 in FIG. 1, for producing a signal that is indicative of the length of travel of the input piston 34 which is indicative of the pedal travel. The system 10 may also include a switch 252 for producing a signal for actuation of a brake light and to provide a signal indicative of movement of the input piston 34. The brake system 10 may further include sensors such as pressure transducers 257 and 259 for monitoring the pressure in the conduits 156 and 166, respectively.

The system 10 further includes a source of pressurized fluid, indicated generally at 15. The source of pressurized fluid 15 may be housed in the hydraulic control unit 14, as schematically shown in FIG. 1, or may be located remotely therefrom or within the brake pedal unit assembly 12. As will be discussed below, the source of pressurized fluid 15 generally provides a controlled source of fluid pressure (or boosted pressure) to various components of the hydraulic control unit 14 via a boost conduit 260. The source of pressurized fluid 15 includes a pump assembly 262 driven by one or more motors 264. The pump assembly 262 can be any pump assembly capable of delivering the desired pressure levels. For example, the pump assembly 262 can be a single piston pump run by a single motor. In the embodiment of the pump assembly 262 schematically shown in FIG. 1, the pump assembly 262 includes three pistons. The three pistons may be offset by about 120 degrees from one another. The pump assembly 262 includes a pump output conduit 270.

The system 10 further includes a boost valve system including a first boost valve 282 and a second boost valve 284. The boost valves 282 and 284 cooperate to provide a controlled or desired fluid pressure to the boost conduit 260. The first boost valve 282 is in fluid communication between the pump output conduit 270 and the boost conduit 260. The second boost valve 284 is in fluid communication between the boost conduit 260 and a reservoir conduit 296. The reservoir conduit 296 is in fluid communication with the reservoir 18. The reservoir conduit 296 provides for a return path for fluid used in a boosting operation and is also in fluid communication with the inlets of the pumps within the pump assembly 262. A filter 299 may also be provided within the reservoir conduit 296. The first and second boost valves 282 and 284 may be proportionally controlled solenoid valves or non-proportionally controlled valves which are connected to and are operated by an electronic control unit (not shown). The first and second boost valves 282 and 284 may be two-way valves having a generally open position and a generally closed position. The first and second boost valves 282 and 284 are normally open valves such that without actuation or current to the solenoid, the valves are in their open positions, such as shown in FIG. 1. The first and second valves 282 and 284 may have a check valve, such as schematically shown in the first boost valve 282, to prevent the flow of fluid in one direction but may allow the flow of fluid in the opposite direction when the boost valve is in its closed position. For example, the first boost valve 282 prevents the flow of fluid from the pump output conduit 270 to the boost conduit when the first boost valve 282 is energized and in its closed position. However, in the closed position, the first boost valve 282 may allow fluid to flow from the boost conduit 260 to the pump output conduit 270. Instead of a pair of valves 282 and 284, the boost system 10 can be configured as any boost valve mechanism capable of providing fluid to the boost conduit 260 at a desired pressure flow and pressure level. The boost system 10 may include a single boost valve or may include multiple independently controlled valves.

As stated above, the brake pedal unit assembly 12 includes a simulation valve 74 which may be mounted in the housing 24 or remotely from the housing 24. As schematically shown in FIGS. 1 and 2, the simulation valve 74 may be a solenoid actuated valve. The simulation valve 74 includes a first port 300 and a second port 302. The port 300 is in fluid communication with the conduit 146 which is in fluid communication with the simulation chamber 144. The port 302 is in fluid communication with the conduit 72 which is in fluid communication with the reservoir 18 via the conduits 66 and 68. The simulation valve 74 is movable between a first position 74a restricting the flow of fluid from the simulation chamber 144 to the reservoir 18, and a second position 74b permitting the flow of fluid between the reservoir 18 and the simulation chamber 144. The simulation valve 74 is in the first position or normally closed position when not actuated such that fluid is prevented from flowing out of the simulation chamber 144, as will be explained in detail below.

The system 10 further includes a first base brake valve 320 and a second base brake valve 322 (or referred to as switching valves or switching valve arrangement). The base brake valves 320 and 322 may be solenoid actuated three way valves. The base brake valves 320 and 322 are generally operable to two positions, as schematically shown in FIG. 1. The first base brake valve 320 has a port 320a in selective fluid communication with the primary output conduit 156 which is in fluid communication with the first output pressure chamber 198. A port 320b is in selective fluid communication with the boost conduit 260. A port 320c is in fluid communication with a conduit 324 which is selectively in fluid communication with the wheel brakes 16a and 16d. The second base brake valve 322 has a port 322a in selective fluid communication with the conduit 166 which is in fluid communication with the second output pressure chamber 228. A port 322b is in selective fluid communication with the boost conduit 260. A port 322c is in fluid communication with a conduit 326 which is selectively in fluid communication with the wheel brakes 16b and 16c.

The system 10 further includes various valves (slip control valve arrangement) for permitting controlled braking operations, such as ABS, traction control, vehicle stability control, and regenerative braking blending. A first set of valves includes an apply valve 340 and a dump valve 342 in fluid communication with the conduit 324 for cooperatively supplying brake fluid received from the boost valves to the wheel brake 16d, and for cooperatively relieving pressurized brake fluid from the wheel brake 16d to a reservoir conduit 343 in fluid communication with the reservoir conduit 296. A second set of valves include an apply valve 344 and a dump valve 346 in fluid communication with the conduit 324 for cooperatively supplying brake fluid received from the boost valves to the wheel brake 16a, and for cooperatively relieving pressurized brake fluid from the wheel brake 16a to the reservoir conduit 343. A third set of valves include an apply valve 348 and a dump valve 350 in fluid communication with the conduit 326 for cooperatively supplying brake fluid received from the boost valves to the wheel brake 16c, and for cooperatively relieving pressurized brake fluid from the wheel brake 16c to the reservoir conduit 343. A fourth set of valves include an apply valve 352 and a dump valve 354 in fluid communication with the conduit 326 for cooperatively supplying brake fluid received from the boost valves to the wheel brake 16d, and for cooperatively relieving pressurized brake fluid from the wheel brake 16d to the reservoir conduit 343.

The system 10 further includes an intensifier, indicated generally at 370. Note that the intensifier 370 is shown enlarged and schematically in FIG. 3. The intensifier 370 includes a housing 372 defining a first bore 374 and a second bore 376. The intensifier 370 further includes a stepped piston 378 having a first portion 380 and a second portion 382 which has a larger diameter than the first end 380. The first portion 380 is slidably disposed in the first bore 374 and is engaged with a seal 384 mounted in a groove formed in the housing 372. The second portion 382 is slidably disposed in the second bore 376 and is engaged with a seal 386 mounted in grove formed in the housing 372. The first portion 380, the first bore 374, and the seal 384 generally define a first pressure chamber 388. The second portion 382, the second bore 376, and the seals 384 and 386, generally define a second pressure chamber 390. A return spring 387 biases the piston 378 to compress the first pressure chambers 388 and decompresses the second pressure chamber 390. The first pressure chamber 388 is in fluid communication with a conduit 391 and a conduit 392. The conduits 391 and 392 are in fluid communication with the pump output conduit 270. A check valve 394 is mounted within the conduit 391. The check valve 394 permits the flow of fluid from the pump output conduit 270 to the first pressure chamber 388, and restricts the flow of fluid from the pressurized chamber 388 to the pump output conduit 270. The second pressure chamber 390 is in fluid communication with the boost conduit 260.

As will be described below in more detail, the intensifier 370 is selectively used in the brake system 10 when it is desired to provide a relatively large or increased amount of fluid into the system 10, such as during a spike apply. During a spike apply, the driver presses on the brake pedal 42 in a rapid and forceful manner. This rapid and forceful manner is detected by various sensors of the system 10 and the system 10 is controlled to use the intensifier 370. The intensifier 370, illustrated in FIGS. 1 and 3, is able to introduce a relatively large amount of fluid due to the stepped design of the piston 378. As shown in FIG. 3, the first portion 380 has a smaller diameter than the diameter of the second portion 382. The effective hydraulic area of the first portion 380 is indicated at $D_1$, as shown in FIG. 3, which is the engagement area of the seal 384 with the outer surface of the first portion 380. The effective hydraulic area of the second portion 382 is indicated at $D_2$, which is the engagement area of the seal 386 with the outer surface of the second portion 382. The diameter $D_2$ is greater than the diameter $D_1$. As the piston 378 is driven downwardly, as viewing FIG. 3, by introduction of fluid into the first pressure chamber 388, the piston 378 will force a larger volume of fluid out of the second pressure chamber 390. Note that while an increase in fluid output volume is introduced when using the intensifier 370, the force input required to move the piston 378 may be increased.

The following is a description of the operation of the brake system 10. FIGS. 1 and 2 illustrate the brake system 10 and the brake pedal unit 20 in the rest position. In this condition, the driver is not depressing the brake pedal 42. Also in the rest condition, the simulation valve 74 may be energized or not energized. During a typical braking condition, the brake pedal 42 is depressed by the driver of the vehicle. The brake pedal 42 is coupled to the travel sensor 240 for producing a signal that is indicative of the length of travel of the input piston 34 and providing the signal to an electronic control module (not shown). The control module may include a microprocessor. The control module receives various signals, processes signals, and controls the operation of various electrical components of the brake system 10 in response to the received signals. The control module can be connected to various sensors such as pressure sensors, travel sensors, switches, wheel speed sensors, and steering angle sensors. The control module may also be connected to an external module (not shown) for receiving information related to yaw rate, lateral acceleration, longitudinal acceleration of the vehicle such as for controlling the brake system 10 during vehicle stability operation. Additionally, the control module may be connected to the instrument cluster for collecting and supplying information related to warning indicators such as ABS warning light, brake fluid level warning light, and traction control/vehicle stability control indicator light.

During normal braking operations (normal boost apply braking operation) the source of pressurized fluid 15 and the first and second boost valves 282 and 284 are usually operated to provide boost pressure to the boost conduit 260 for actuation of the wheel brakes 16a-d. The boost conduit 260 provides pressurized fluid to the conduits 324 and 326 via the energized base brake valves 320 and 322. Under certain driving conditions, the control module communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending). The control module actuates the boost valves 282 and 284 to provide a desired boost pressure level and fluid flow to the boost conduit 260. The control module may control the boost valves 282 and 284 in various different ways to provide the desired pressure level at the boost conduit 260. The boost valves 282 and 284 are selectively actuated to divert fluid from the pump output conduit 270, and selectively actuated to divert fluid to the reservoir conduit 296 to obtain the desired fluid flow and pressure level in the boost conduit 260 when the pump 262 and motor 264 are running. Ideally, the boost valves 282 and 284 are actuated to provide a relatively quiet operation of the components of the hydraulic control unit 14 and in an energy efficient manner. Under certain conditions, it may be desirable to energize the boost valve 282 during the initial stages of a normal braking operation (non-spike apply) so that the motor 264 can be run slower to reduce the noise level. Although two boost valves are shown, it should be understood that the boost valves may be replaced with single boost valve, such as a spool valve, or may have any combination of number of boost valves. A pressure transducer 360 may be connected to the boost conduit 260 to provide a signal for the control module indicative of the pressure level within the conduit 260.

During a normal braking mode, otherwise named as a normal boost apply braking operation, the flow of pressurized fluid from the brake pedal unit 20 generated by depression of the brake pedal 42 is diverted into the internal pedal simulator assembly 100. The simulation valve 74 is actuated to divert fluid through the simulation valve 74 from the simulation chamber 144 to the reservoir 18 via the conduits 146, 72, 66, and 68. Note that fluid flow from the simulation chamber 144 to the reservoir 18 is closed off once the passageways 64 in the input piston 34 moves past the seal 60. Note that prior to movement of the input piston 34, as shown in FIGS. 1 and 2, the simulation chamber 144 is in fluid communication with the reservoir 18 via the conduits 66 and 68.

During the duration of the normal braking mode, the simulation valve 74 remains open permitting the fluid to flow from the simulation chamber 144 to the reservoir 18. The fluid within the simulation chamber 144 is non-pressurized and is under very low pressures, such as atmospheric or low reservoir pressure. This non-pressurized configuration has an advantage of not subjecting the sealing surfaces of the pedal simulator to large frictional forces from seals acting against surfaces due to high pressure fluid. In conventional pedal simulators, the piston(s) are under increasingly high pressures as the brake pedal is depressed subjecting them large frictional forces from the seals, thereby adversely effecting the pedal feel.

Also during the normal boost apply braking operation, the base brake valves 320 and 322 are energized to a secondary position to prevent the flow of fluid from the conduits 156 and 166 through the valves 320 and 322. Fluid flow is prevented from flowing from the ports 320a and 322a to the ports 320c and 322c, respectively. Thus, the fluid within the first and second output pressure chambers 198 and 228 of the brake pressure unit 20 are fluidly locked which generally prevents the first and second output pistons 38 and 40 from moving further. More specifically, during the initial stage of the normal boost apply braking operation, movement of the input rod 45 causes movement of the input piston 34 in a rightward direction, as viewing FIG. 2. Initial movement of the input piston 34 causes movement of the primary piston 38 via the low rate simulator spring 108. Movement of the primary piston 38 causes initial movement of the secondary piston 40 due to the mechanical connection therebetween by the locking member 180 and the springs 188 and 190. Note that during this initial movement of the primary piston 38, fluid is free to flow from the primary pressure chamber 198 to the reservoir 18 via conduits 85, 154, and 68 until the conduit 85 moves past the seal 81. Also, during initial movement of the secondary piston 40, fluid is free to flow from the secondary pressure chamber 228 to the reservoir 18 via the conduits 155 and 164 until the conduit 155 moves past the seal 154.

After the primary and secondary pistons 38 and 40 stop moving (by closing of the conduits 85 and 155 and closing of the first and second base brake valves 320 and 322), the input piston 34 continues to move rightward, as viewing FIGS. 1 and 2, upon further movement by the driver depressing the brake pedal 42. Further movement of the input piston 34 compresses the various springs of the pedal simulator assembly 100, thereby providing a feedback force to the driver of the vehicle. During operation of the source of pressurized fluid 15, the pistons of the pump assembly 262 may all be supplying fluid to the conduit 270. During a normal boost apply braking operation in which a spike apply has not been detected, the first boost valve 282 generally remains in its open position, as shown in FIG. 1. The second boost valve 284 can be selectively and/or proportionally controlled to dump a desired amount of fluid to the reservoir 18 to reduce the pressure level within the boost conduit 260. The second boost valve 284 can also be controlled to its closed position, thereby permitting a build-up of pressure within the boost conduit by the pressure generated by the pump assembly 262 from the conduit 270. During a braking event, the control module can also selectively actuate the apply valves 340, 344, 348, and 352 and the dump valves 342, 346, 350, and 354 to provide a desired pressure level to the wheel brakes 16d, 16a, 16c, and 16b, respectively.

Under a normal boost apply braking operation in which a spike apply event has been detected, the control module may actuate the first boost valve 282 to its closed position such that the fluid from the pump output conduit 270 is diverted through the intensifier 370. As stated above, a spike apply event is determined when the driver presses on the brake pedal 42 in a rapid and forceful manner. In this situation, it may be desirable to provide a relatively large amount of fluid to the boost conduit 260. Thus, the first brake valve 282 may be actuated to its closed position to have the intensifier 370 provide fluid to the boost conduit 260. As fluid from the pump output conduit 270 enters the first pressure chamber 388, the piston 378 is driven downwardly, as viewing FIG. 3. Movement of the piston 378 will force a larger volume of fluid out from the second pressure chamber 390 compared to the fluid entering the first pressure chamber 388. Note that while an increase in fluid output volume is introduced when using the intensifier 370, the force input required to move the piston 378 may be increased.

It is preferred that after a spike apply event is finished, the piston 378 return to its initial or rest position, as shown in FIG. 3, so that the intensifier will be fully operationally when another spike apply event is detected. In other words, it is desirable to have the piston 378 return to its rest position so that a second full stroke of the piston 378 is available when a second or future spike apply event is detected. The restricted orifice 396 allows the piston 378 to return. At the end of the spike apply event, the control module actuates the first boost valve 282 to its open position, thereby permitting fluid to flow between the pump output conduit 270 and the boost conduit 260. During this period, essentially the same pressure is acting on both portions 380 and 382 of the piston 378. The spring 387 will return the piston 378 to its rest position. The spring 387 may have a relatively low spring rate such that it can overcome the seal friction required to return the piston 378 in a desired amount of time. A low spring rate of the spring 387 is preferred because spring force must be overcome during use of the intensifier 370 when the piston is moving in a direction against the bias of the spring 387. Note that during use of intensifier 370, fluid flow can rapidly flow through the check valve 394 to energize the first pressure chamber 388.

As shown in FIG. 3, the second bore 376 and the seals 384 and 386 generally an annular chamber 385. In a preferred embodiment, the annular chamber 385 is not a fluid chamber and instead holds a volume of air. During stroke of the piston 378, a vacuum is pulled within the annular chamber 385. Although some fluid leakage may occur, the fluid may flow out of the chamber 385 past the lip seal 386 and will not impair the operation of the system 10. Alternatively, the chamber 385 could be vented to atmosphere by forming a passageway (not shown) through the housing 372 that is in communication with the chamber 385 and the atmosphere. In this situation, the seals 384 and 386 should be configured to prevent leakage therethrough to the chamber 385. Thus, it may be more economical to simply permit a pulling of a vacuum within the chamber 385 during operation of the intensifier 370. Another alternative approach is to vent the chamber 385 by a conduit (not shown) that fluidly communicates either directly or indirectly with the reservoir 18. Of course, this situation may require the expense of forming or providing a conduit connected to the reservoir 18.

In the event of a loss of electrical power to portions of the brake system 10, the brake system 10 provides for manual push through or manual apply such that the brake pedal unit 20 can supply high pressure fluid to the primary output conduit 156 and the secondary output conduit 166. During an electrical failure, the pump motor 264 might cease to operate, thereby failing to produce pressurized hydraulic brake fluid from the pump assembly 262. Furthermore, the boost valves 282 and 284 might return to a de-energized position if energized. In this situation, the boost valves 282 and 284 night not supply the desired pressurized fluid within the boost conduit 260. The base brake valves 320 and 322 will shuttle to the positions shown in FIG. 1 closing off fluid flow from the boost conduit 260 to the conduits 324 and 326. In these positions, the base brake valves 320 and 322 permit fluid flow from the conduits 156 and 166 (via the ports 320a and 322a) to the conduits 324 and 326 (via the ports 320c and 322c), respectively. Thus, the brake pedal unit 20 may now provide a manual apply for energizing the fluid conduits 324 and 326 for actuation of the wheel brakes 16a-d. The simulation valve 74 is shuttled to its closed position as shown in FIGS. 1 and 2 to prevent fluid from flowing out of the simulation chamber 144 to the reservoir 18, thereby hydraulically locking the simulation chamber 144. During manual apply, the primary and secondary output pistons 38 and 40 will advance rightward pressurizing the chambers 198 and 228. Fluid flows from the chambers 198 and 228 into the conduits 324 and 326, respectively, to actuate the wheel brakes 16a-d.

During the manual push-through apply, initial movement of the input piston 34 forces the spring(s) of the pedal simulator to start moving the pistons 38 and 40. After further movement of the input piston 34, in which the fluid within the simulation chamber 144 is trapped or hydraulically locked, further movement of the input piston 34 pressurizes the simulation chamber 144 causing movement of the primary piston 38 which also causes movement of the secondary piston 40 due to pressurizing of the primary chamber 144. As shown in FIGS. 1 and 2, the input piston 34 has a smaller diameter (about the seal 60) than the diameter of the primary piston 38 (about the seal 80). Since the hydraulic effective area of the input piston 34 is less than the hydraulic effective area of the primary piston 38, the input piston 34 may travel more axially in the right-hand direction as viewing FIGS. 1 and 2 than the primary piston 38. An advantage of this configuration is that although a reduced diameter effective area of the input piston 34 compared to the larger diameter effective area of the primary piston 38 requires further travel, the force input by the driver's foot is reduced. Thus, less force is required by the driver acting on the brake pedal 42 to pressurize the wheel brakes compared to a system in which the input piston and the primary piston have equal diameters.

In another example of a failed condition of the brake system 10, the hydraulic control unit 12 may fail as discussed above and furthermore one of the output pressure chambers 198 and 228 may be reduced to zero or reservoir pressure, such as failure of a seal or a leak in one of the conduits 156 or 166. The mechanical connection of the primary and secondary pistons 38 and 40 prevents a large gap or distance between the pistons 38 and 40 and prevents having to advance the pistons 38 and 40 over a relatively large distance without any increase in pressure in the non-failed circuit. For example, if the brake system 10 is under a manual push through mode and additionally fluid pressure is lost in the output circuit relative to the secondary piston 40, such as for example in the conduit 166, the secondary piston 40 will be forced or biased in the rightward direction due to the pressure within the primary chamber 198. If the primary and secondary pistons 38 and 40 were not connected together, the secondary piston 40 would freely travel to its furthermost right-hand position, as viewing FIGS. 1 and 2, and the driver would have to depress the pedal 42 a distance to compensate for this loss in travel. However, because the primary and secondary pistons 38 and 40 are connected together through the locking member 180, the secondary piston 40 is prevented from this movement and relatively little loss of travel occurs in this type of failure. Thus, the maximum volume of the primary pressure chamber 198 is limited had the secondary piston 40 not be connected to the primary piston 38.

In another example, if the brake system 10 is under a manual push through mode and additionally fluid pressure is lost in the output circuit relative to the primary piston 40, such as for example, in the conduit 156, the secondary piston 40 will be forced or biased in the leftward direction due to the pressure within the secondary chamber 228. Due to the configuration of the brake pedal unit 20, the left-hand end of the secondary piston 40 is relatively close to the right-hand end of the primary piston 38. Thus, movement of the secondary piston 40 towards the primary piston 38 during this loss of pressure is reduced compared to a conventional master cylinder in which the primary and secondary pistons have equal diameters and are slidably disposed in the same diameter bore. To accomplish this advantage, the housing 24 of the brake pedal unit 20 includes a stepped bore arrangement such that diameter of the second bore 28 which houses the primary piston 38 is larger than the third bore 30 housing the secondary piston 40. A portion of the primary chamber 198 includes an annular region surrounding a left-hand portion of the secondary piston 40 such that the primary and secondary pistons 38 and 40 can remain relatively close to one another during a manual push-through operation. In the configuration shown, the primary and secondary pistons 38 and 40 travel together during a manual push-through operation in which both of the circuits corresponding to the conduits 156 and 166 are intact. This same travel speed is due to the hydraulic effective areas of the pistons 38 and 40, for their respective output pressure chambers 198 and 228, are approximately equal. In a preferred embodiment, the area of the diameter of the secondary piston 40 is approximately equal to the area of the diameter of the primary piston 38 minus the area of the diameter of the secondary piston 40. Of course, the brake pedal unit 20 could be configured differently such that the primary and secondary pistons 38 and 40 travel at different speeds and distances during a manual push though operation.

There is illustrated in FIG. 4 an alternate embodiment of an intensifier 400 which may be used for the intensifier 370 in the system 10. The components of the intensifier 400 are housed in a housing 402 which may be the same as the block or housing of the hydraulic control unit 14. The housing 402 defines a bore 404 having a groove 406 formed therein. A lip seal 408 is disposed in the groove 406. A cup-shaped piston 410 is slidably disposed in the bore 404. An outer cylindrical surface 412 of the piston 410 is engaged with the lip seal 408. The bore 404 is closed off by a retainer 414 secured to the housing 402. The retainer 414 can be secured to the housing 402 by as cir-clip 416 or any other suitable manner, such as by a threaded connection. A seal 418 is disposed in a groove 420 of the retainer 414 to seal the bore 404. A return spring 422 biases the piston 410 upwardly, as viewing FIG. 4.

The intensifier 400 further includes a guide member 430 disposed within an interior 432 of the cup-shaped piston 410. The guide member 430 includes a first end having an extension 434 which is disposed in a bore 436 formed in the housing 402. A seal 438 is disposed in a groove 440 formed in the extension 434 and sealingly engages with an inner cylindrical surface 442 of the bore 436. The guide member 430 has a second end having a seal 444 disposed in a groove 446 formed in the piston 410. The seal 444 sealingly engages with an inner cylindrical surface 448 of the piston 410.

The guide member 420, the inner cylindrical surface 448 of the piston 410, and the seals 444 and 438 generally define a first pressure chamber 450. The first pressure chamber 450 is in fluid communication with the pump output conduit 270 when the intensifier 370 is used with the brake system 10. The bore 404, the seals 408 and 418, the piston 410, and the retainer 414 generally define a second pressure chamber 452. The second pressure chamber 452 is in fluid communication with the boost conduit 260 when used with the system 10.

During use of the intensifier 400, the guide member 420 generally does not move relative to the housing 404, and thus only the piston 410 will move within the bore 404. The guide member 420 includes a passageway 460 which communicates with the first pressure chamber 450 and the second pressure chamber 452. The intensifier 400 may include a check valve assembly in the form of a ball 462 cooperating with a seat 464 formed in the passageway 460 of the guide member 420. The ball 462 and the seat 464 cooperate to function in a similar manner as the check valve 394 in the system 10, as described above. To provide the function of the restricted orifice 396 of the intensifier 370, the valve seat 464 may have one or more leak paths 468 formed therein to allow the flow of fluid therethrough even when the ball 462 is seated on the seat 464.

During use, such as during a spike apply, pressurized fluid enters the first pressure chamber 450 via the pump output conduit 270. The increase in pressure in the first pressure chamber 450 moves the piston 410, downwardly as viewing FIG. 4, against the bias of the spring 422. Movement of the piston 410 causes in increase in pressure within the second pressure chamber 452 which enters into the boost conduit 260. As discussed above with respect to the intensifier 370, movement of the piston 410 will force a larger volume of fluid out from the second pressure chamber 452 compared to the fluid entering the first pressure chamber 450. In the embodiment shown in FIG. 4, the intensifier 400 multiples the flow of fluid exiting the second pressure chamber 452 by about 2.4 times compared to the flow into the first pressure chamber 450. Of course, the intensifier 400 can be configured to any suitable dimensions to obtain multiples greater than or less than 2.4.

Figure 5:
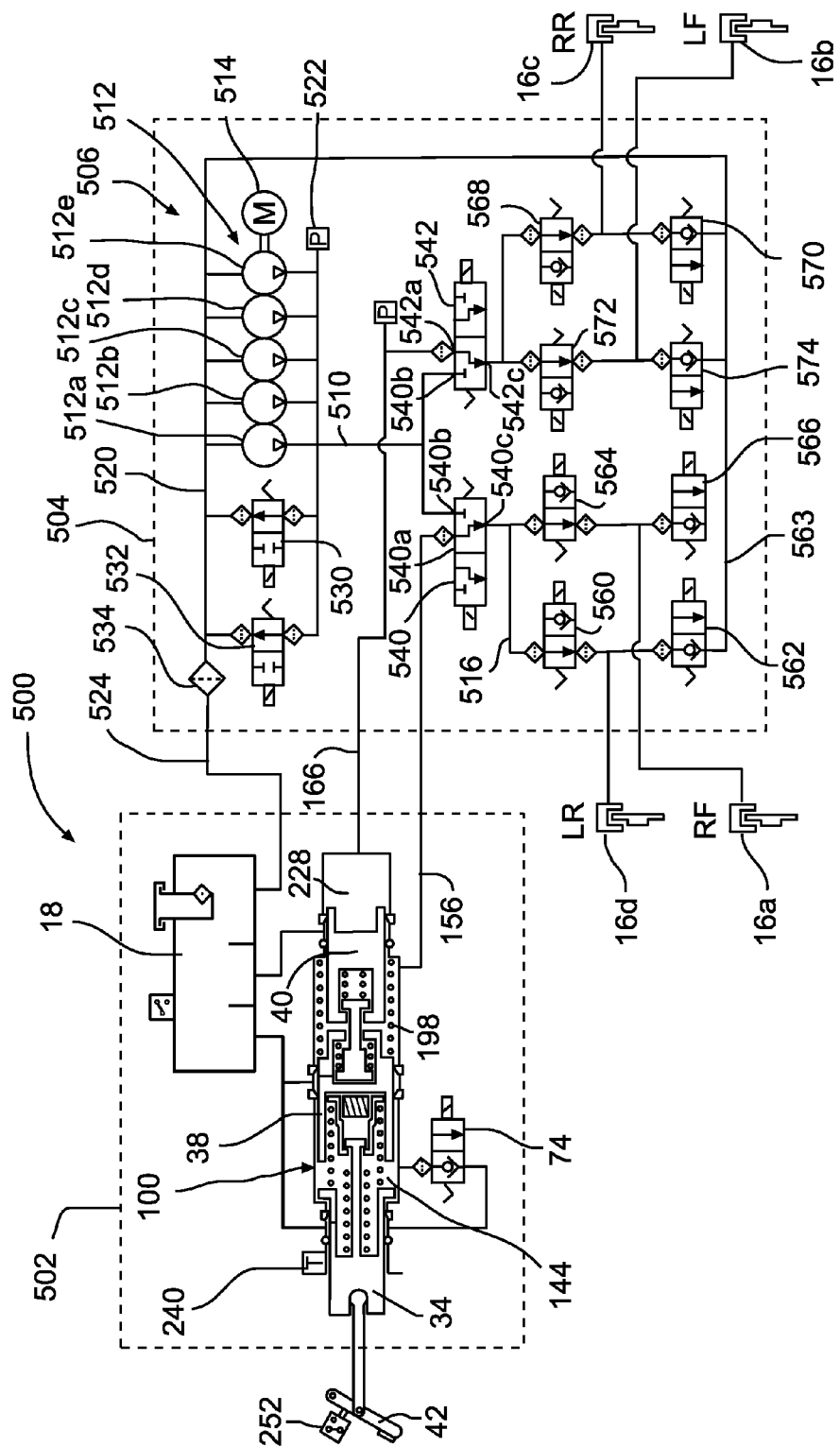
FIG. 5 is a schematic illustration of a second embodiment of a brake system.

There is illustrated in FIG. 5 a second embodiment of a vehicle brake system indicated generally at 500. Similar to the above described brake system 10, the brake system 500 may suitably be used on a ground vehicle such as an automotive vehicle having four wheels and a wheel brake for each wheel. Furthermore, the brake system 500 can be provided with other braking functions such as anti-lock braking (ABS), other slip control features, and regenerative braking blending to effectively brake the vehicle. The brake system 500 is similar in function and structure of some aspects of the brake system 10 and, therefore, like numbers and or names may be used to reference similar components.

The brake system 500 generally includes a brake pedal unit assembly, indicated generally at 502, which may be similar to the brake pedal unit assembly 12 as described above with respect to FIGS. 1 and 2. Therefore, like numbers will be used to describe similar components.

One of the differences between the systems 10 and 500 is that the brake system 500 uses a source of pressurized fluid 506, compared to the source of pressurized fluid 15 of the system 10. Another difference is that the brake system 500 uses different hydraulic control unit 504 compared to the hydraulic control unit 14 of the system 10. However, it should be understood that some of the components of the hydraulic control unit 504 are similar in function to the hydraulic control unit 14 and, thus, may not be explained in full detail again below.

The system 500 may include a travel sensor, schematically shown at 240 in FIG. 5, for producing a signal that is indicative of the length of travel of the input piston 34 which is indicative of the pedal travel. The system 500 may also include a switch 252 for producing a signal for actuation of a brake light and to provide a signal indicative of movement of the input piston 34.

The source of pressurized fluid 15 may be housed in the hydraulic control unit 506, as schematically shown in FIG. 5, or may be located remotely therefrom or within the brake pedal unit assembly 502. The source of pressurized fluid 15 generally provides a controlled source of fluid pressure (or boosted pressure) to various components of the hydraulic control unit 14 via a boost conduit 510. The source of pressurized fluid 15 includes a pump assembly, indicated generally at 512, driven by one or more motors 514. The pump assembly 512 is preferably a five piston pump, such that the pump assembly 512 includes 5 separate pistons, schematically represented by 512a, 512b, 512c, 512d, and 512e. The pistons 512a-e may be arranged in a single plane and offset from one another by about 72 degrees from one another. The pump assembly 512 includes an input conduit 520 and an output conduit 522. The input conduit 520 is in fluid communication with a reservoir conduit 524 in fluid communication with the reservoir 18. The output conduit 522 is in fluid communication with the boost conduit 510. The pump assembly 506 will be explained in more detail below.

The system 500 further includes a boost valve system including a first boost valve 530 and a second boost valve 532. The boost valves 530 and 532 cooperate to provide a controlled or desired fluid pressure to the boost conduit 510. The first boost valve 530 is in fluid communication between the pump output conduit 522 and the boost conduit 510. The second boost valve 532 is in fluid communication between the boost conduit 510 and the reservoir conduit 524. The reservoir conduit 524 provides for a return path for fluid used in a boosting operation and is also in fluid communication with the inlets of the pump assembly 506. A filter 534 may also be provided within the reservoir conduit 524. The first and second boost valves 530 and 532 may be proportionally or non-proportionally controlled solenoid valves which are connected to and are operated by an electronic control unit (not shown). The first and second boost valves 530 and 532 may be two-way valves having a generally open position and a generally closed position. The first and second boost valves 530 and 532 are normally open valves such that without actuation or current to the solenoid, the valves are in their open positions, such as shown in FIG. 5. Each of the first and second valves 530 and 532 may have a check valve, such as schematically shown in FIG. 5, to prevent the flow of fluid in one direction but may allow the flow of fluid in the opposite direction when the boost valve is in its closed position. Instead of a pair of valves 530 and 532, the boost system 500 can be configured as any boost valve mechanism capable of providing fluid to the boost conduit 510 at a desired pressure flow and pressure level. The boost system 500 may include a single boost valve or may include multiple independently controlled valves.

The system 500 further includes a first base brake valve 540 and a second base brake valve 542 (or referred to as switching valves or switching valve arrangement). The base brake valves 540 and 542 may be solenoid actuated three way valves. The base brake valves 540 and 542 are generally operable to two positions, as schematically shown in FIG. 5. The first base brake valve 540 has a port 540a in selective fluid communication with the primary output conduit 156 which is in fluid communication with the first output pressure chamber 198. A port 540b is in selective fluid communication with the boost conduit 510. A port 540c is in fluid communication with a conduit 546 which is selectively in fluid communication with the wheel brakes 16a and 16d. The second base brake valve 542 has a port 542a in selective fluid communication with the conduit 166 which is in fluid communication with the second output pressure chamber 228. A port 542b is in selective fluid communication with the boost conduit 510. A port 542c is in fluid communication with a conduit 548 which is selectively in fluid communication with the wheel brakes 16b and 16c.

The system 500 further includes various valves (slip control valve arrangement) for permitting controlled braking operations, such as ABS, traction control, vehicle stability control, and regenerative braking blending. A first set of valves includes an apply valve 560 and a dump valve 562 in fluid communication with the conduit 546 for cooperatively supplying brake fluid received from the boost valves to the wheel brake 16d, and for cooperatively relieving pressurized brake fluid from the wheel brake 16d to a reservoir conduit 563 in fluid communication with the reservoir conduit 72. A second set of valves include an apply valve 564 and a dump valve 566 in fluid communication with the conduit 546 for cooperatively supplying brake fluid received from the boost valves to the wheel brake 16a, and for cooperatively relieving pressurized brake fluid from the wheel brake 16a to the reservoir conduit 563. A third set of valves include an apply valve 568 and a dump valve 570 in fluid communication with the conduit 548 for cooperatively supplying brake fluid received from the boost valves to the wheel brake 16c, and for cooperatively relieving pressurized brake fluid from the wheel brake 16c to the reservoir conduit 563. A fourth set of valves include an apply valve 572 and a dump valve 574 in fluid communication with the conduit 326 for cooperatively supplying brake fluid received from the boost valves to the wheel brake 16d, and for cooperatively relieving pressurized brake fluid from the wheel brake 16d to the reservoir conduit 563.

The following is a description of the operation of the brake system 500. FIG. 5 illustrates the brake system 500 and the brake pedal unit 502 in the rest position. In this condition, the driver is not depressing the brake pedal 42. Also in the rest condition, the simulation valve 74 may be energized or not energized. During a typical braking condition, the brake pedal 42 is depressed by the driver of the vehicle. The brake pedal 42 is coupled to the travel sensor 240 for producing a signal that is indicative of the length of travel of the input piston 34 and providing the signal to an electronic control module (not shown). The control module may include a microprocessor. The control module receives various signals, processes signals, and controls the operation of various electrical components of the brake system 500 in response to the received signals. The control module can be connected to various sensors such as pressure sensors, travel sensors, switches, wheel speed sensors, and steering angle sensors. The control module may also be connected to an external module (not shown) for receiving information related to yaw rate, lateral acceleration, longitudinal acceleration of the vehicle such as for controlling the brake system 500 during vehicle stability operation. Additionally, the control module may be connected to the instrument cluster for collecting and supplying information related to warning indicators such as ABS warning light, brake fluid level warning light, and traction control/vehicle stability control indicator light.

During normal braking operations (normal boost apply braking operation) the source of pressurized fluid 506 and the first and second boost valves 530 and 532 are usually operated to provide boost pressure to the boost conduit 510 for actuation of the wheel brakes 16a-d. The boost conduit 510 provides pressurized fluid to the conduits 546 and 548 via the energized base brake valves 540 and 542. Under certain driving conditions, the control module communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending). The control module actuates the boost valves 530 and 532 to provide a desired boost pressure level and fluid flow to the boost conduit 510. The control module may control the boost valves 530 and 532 in various different ways to provide the desired pressure level at the boost conduit 510. The boost valves 530 and 532 are selectively actuated to divert fluid from the pump output conduit 522, and selectively actuated to divert fluid to the reservoir conduit 524 to obtain the desired fluid flow and pressure level in the boost conduit 510 when the pump 512 and motor 514 are running. Ideally, the boost valves 530 and 532 are actuated to provide a relatively quiet operation of the components of the hydraulic control unit 504 and in an energy efficient manner. Although two boost valves are shown, it should be understood that the boost valves may be replaced with single boost valve, such as a spool valve, or may have any combination of number of boost valves. A pressure transducer 580 may be connected to the boost conduit 510 to provide a signal for the control module indicative of the pressure level within the conduit 510 and 522.

During a normal boost apply braking operation, the flow of pressurized fluid from the brake pedal unit 502 generated by depression of the brake pedal 42 is diverted into the internal pedal simulator assembly 100. The simulation valve 74 is actuated to divert fluid through the simulation valve 74 from the simulation chamber 144 to the reservoir 18.

Also during the normal boost apply braking operation, the base brake valves 540 and 542 are energized to a secondary position to prevent the flow of fluid from the conduits 156 and 166 through the valves 540 and 542. Fluid flow is prevented from flowing from the ports 540a and 542a to the ports 540c and 542c, respectively. Thus, the fluid within the first and second output pressure chambers 198 and 228 of the brake pressure unit 20 are fluidly locked which generally prevents the first and second output pistons 38 and 40 from moving further. The brake pedal unit 502 may function in a similar manner as the brake pedal unit 20 described above with respect to the system 10 during normal boosted operation, manual push through, and loss of electrical power.

Note that the brake system 500 shown in FIG. 5 does not include an intensifier. Thus, under a spike apply condition, the system 500 will function in a similar manner as during a normal boosted operation. However, the system 500 could be configured to include an intensifier if so desired.

As stated above, during normal braking operations (normal boost apply braking operation) the source of pressurized fluid 506 provides high pressure fluid to the pump output conduit 522. The first and second boost valves 530 and 532 are operated to provide a desired boost pressure to the boost conduit 510 for actuation of the wheel brakes 16a-d. In the embodiment illustrated in FIG. 5, the pump assembly 512 is preferably a five-piston pump having five separate pistons 512a, 512b, 512c, 512d, and 512e. Each of the pistons 512a, 512b, 512c, 512d, and 512e may be slidably disposed in a bore of a pump housing (not shown). The pistons 512a, 512b, 512c, 512d, and 512e may be mounted in the housing such that they extend radially from a common axis point and may be offset from one another by about 72 degrees. The motor 514 may rotationally drive an eccentric about a rotational axis. The eccentric may be supported by one or more bearings mounted in the housing. The eccentric includes an engagement surface that is offset relative to the rotational axis. As the motor rotates the eccentric, the eccentric engages with each of the pistons during one rotational cycle about the rotational axis alternatively move the pistons in reciprocating movement with the bore. During an apply stroke in a direction away from the rotational axis the piston forces pressurized fluid to the pump output conduit 522. In the return stroke towards the rotational axis, portions of the bore are replenished with fluid. This process is rapidly repeated to supply pressurized fluid to the pump output conduit 522. Note that the bores for the pistons 512a, 512b, 512c, 512d, and 512e may lie in the same plane, or one or more pistons may be arranged outside of the plane or to angle of a plane.

Due to the operation of the reciprocating pistons of the pump assembly 512, the flow of fluid output to the pump output conduit 522 is not constant but has a sinusoidal or rippling output with pressure increases and decreases relative to time. Since the pump assembly 512 of the brake system 500 does not charge an accumulator compared to other conventional brake systems, it is desirable to reduce the rippling or pressure differences since this flow is being delivered to the wheel brakes 16a-d. It has been found that a three piston style pump may be undesirable due to the larger rippling inherently caused by three piston pump. To obtain the same flow requirement from a five piston pump, the three piston pump would have larger pistons and bores, thereby causing an increased rippling effect. This also has the undesirable effect of causing additional noise during operation of the pump assembly. Another disadvantage for a larger three piston pump is that the bearing loads of the eccentric may be relatively high, requiring the need for more expensive bearing assemblies. Note that three piston pump assemblies are used with conventional brake systems that use pump assemblies to charge an accumulator since the rippling output is not that important to minimize. It has been found that an odd number of pistons is more desirable than an even number of pistons with respect to noise and rippling output effects. It has also been found that a seven piston pump may not be desirable because of packaging constraints of sizing seven pistons within a pump housing. The spacing between the seven pistons may be too close or tight.

Figure 6:
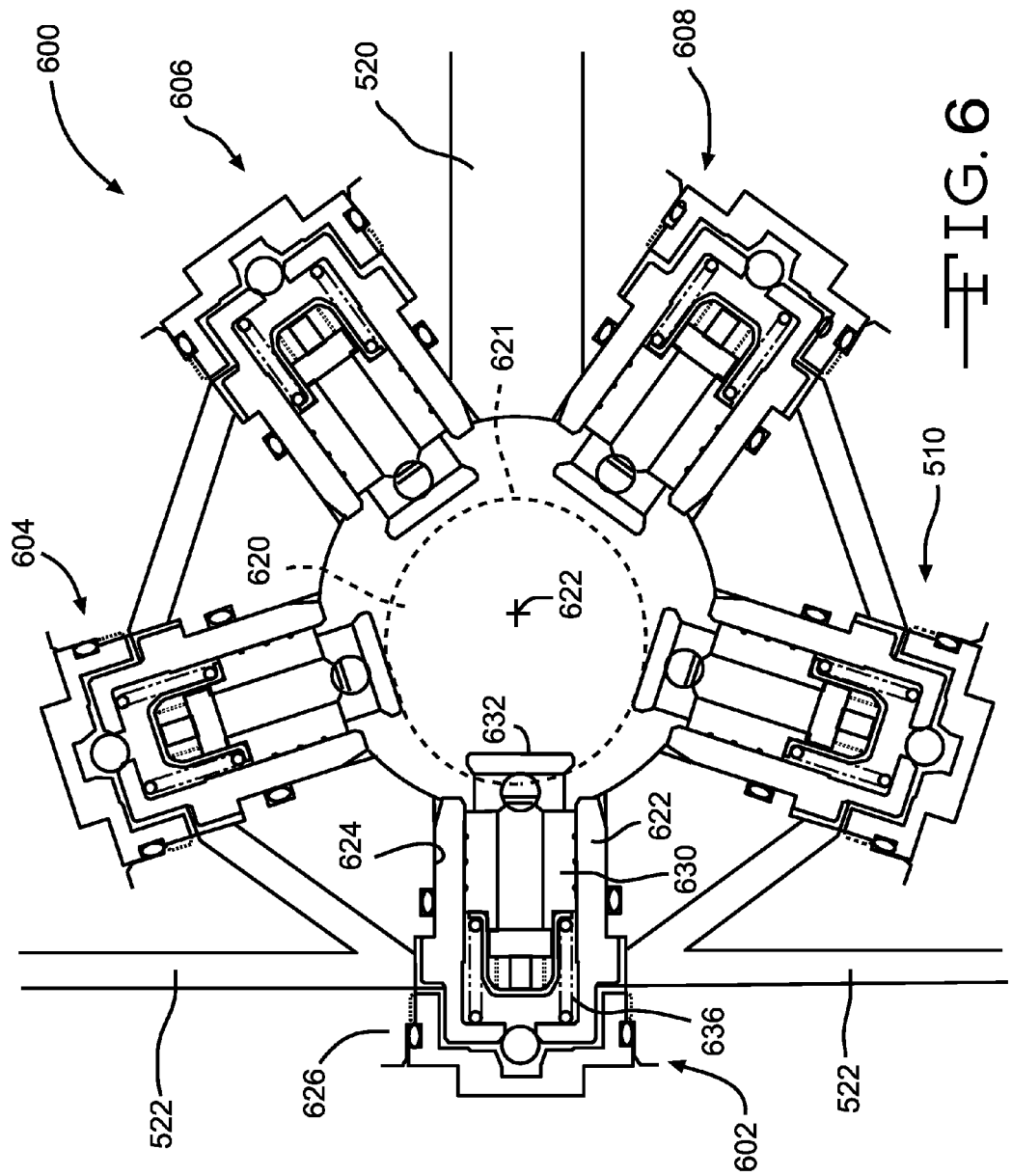
FIG. 6 is a cross-sectional view of an alternate embodiment of a pump assembly.

There is illustrated in FIG. 6 an alternate embodiment of a pump assembly 600 which may be used for the pump assembly 512 in the system 500. The pump assembly 600 is a five piston pump design, such that the pump assembly 600 includes five separate reciprocating piston assemblies, indicated generally at 602, 604, 606, 608, and 610. Note that each of the piston assemblies 602, 604, 606, 608, and 610 are shown in their full return stroke and are not positioned as they would be during use. Each of the piston assemblies is engaged with a rotating eccentric, indicated by phantom lines 620, which is offset from its rotating axis 622. Note that the phantom line eccentric is shown as mounted in the pump assembly 600 and that during installation, the pistons of the piston assemblies 602, 604, 606, 608, and 610 contact and engage with the outer surface 621 of the eccentric 622

Each of the piston assemblies 602, 604, 606, 608, and 610 are generally the same with respect to structure and function and, thus, only the piston assembly 602 will be described in detail. The piston assembly 602 includes a sleeve 622 mounted in a bore 624 of a housing 626. A piston 630, having a first end 632 engaged with the eccentric 620, is slidably disposed in the sleeve 622 for movement between a bottom-dead-center position and a top-dead-center position. The eccentric 620 alternatively moves the pistons 630 from the bottom-dead-center position to the top-dead-center position. The sleeve 622 guides the reciprocation of the piston 630. A biasing member moves the piston 630 from the top-dead-center position to the bottom-dead-center position. Preferably, the biasing member includes a spring 636 disposed in the sleeve 622. The spring 636 maintains engagement of the piston 630 with the eccentric 620. Reciprocating movement of the piston 630 draws in fluid from a conduit 520 and pressurizes the conduit 522. The piston assembly 602 can include various valve assemblies, as shown in FIG. 6, to close off pressure chambers to generate the pressure within the conduit 522.

Figure 7:
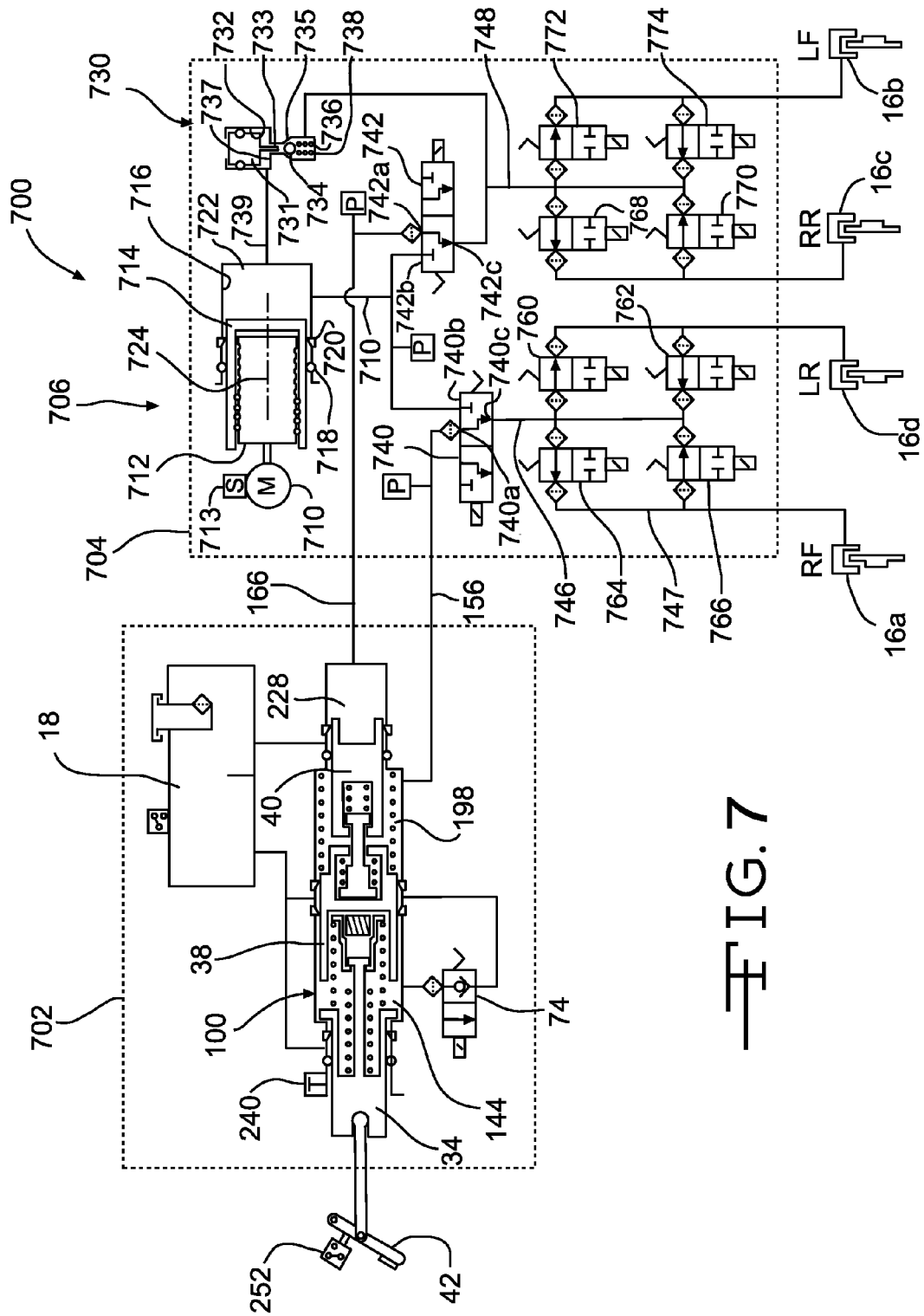
FIG. 7 is a schematic illustration of a third embodiment of a brake system.

There is illustrated in FIG. 7 a third embodiment of a vehicle brake system indicated generally at 700. Similar to the above described brake systems 10 and 500, the brake system 700 may suitably be used on a ground vehicle such as an automotive vehicle having four wheels and a wheel brake for each wheel. Furthermore, the brake system 700 can be provided with other braking functions such as anti-lock braking (ABS), other slip control features, and regenerative braking blending to effectively brake the vehicle. The brake system 700 is similar in function and structure of some aspects of the brake systems 10 and 500 and, therefore, like numbers and or names may be used to reference similar components.

The brake system 700 generally includes a brake pedal unit assembly, indicated generally at 702, which may be similar to the brake pedal unit assemblies 12 and 502 as described above with respect to FIGS. 1, 2, and 5. Therefore, like numbers will be used to describe similar components. The brake pedal unit assembly 902 may function in a similar manner as the brake pedal unit assembly 12 and 702. The brake pedal unit assembly 702 provides a pedal simulator function as well as providing for a manual push through operation under certain failed conditions.

One of the differences between the systems 10 and 700 is that the brake system 700 uses a plunger assembly, indicated generally at 706, of a hydraulic control unit 704 instead of a source of pressurized fluid and boost valves. As will be explained in detail below, the system 700 uses the plunger assembly 706 to provide a desired pressure level to each of the wheel brakes 16a-d. Fluid from the wheel brakes 16a-d is returned to the plunger assembly 706 rather than being diverted to the reservoir 18. However, it should be understood that some of the components of the hydraulic control unit 704 are similar in function to the hydraulic control unit 14 and, thus, may not be explained in full detail again below.

The system 700 may include a travel sensor, schematically shown at 240 in FIG. 7, for producing a signal that is indicative of the length of travel of the input piston 34 which is indicative of the pedal travel. The system 700 may also include a switch 252 for producing a signal for actuation of a brake light and to provide a signal indicative of movement of the input piston 34.

The system 700 further includes a first base brake valve 740 and a second base brake valve 742 (or referred to as switching valves or switching valve arrangement). The base brake valves 740 and 742 may be solenoid actuated three way valves. The base brake valves 740 and 742 are generally operable to two positions, as schematically shown in FIG. 7. The first base brake valve 740 has a port 740a in selective fluid communication with the primary output conduit 156 which is in fluid communication with the first output pressure chamber 198. A port 740b is in selective fluid communication with a boost conduit 710. A port 740c is in fluid communication with a conduit 746 which is selectively in fluid communication with the wheel brakes 16a and 16d. The second base brake valve 742 has a port 742a in selective fluid communication with the conduit 166 which is in fluid communication with the second output pressure chamber 228. A port 742b is in selective fluid communication with the boost conduit 710. A port 742c is in fluid communication with a conduit 748 which is selectively in fluid communication with the wheel brakes 16b and 16c.

The system 700 further includes various valves (slip control valve arrangement) for permitting controlled braking operations, such as ABS, traction control, vehicle stability control, and regenerative braking blending. A first set of valves includes a first valve 760 and a second valve 762 in fluid communication with the conduit 746 for cooperatively supplying brake fluid received from the plunger assembly 706 and to return fluid to the plunger assembly 706. A second set of valves include a first valve 764 and a second valve 766 in fluid communication with the conduit 746 for cooperatively supplying brake fluid received from the plunger assembly 706 and to return fluid to the plunger assembly 706. A third set of valves include a first valve 768 and a second valve 770 in fluid communication with the conduit 748 for cooperatively supplying brake fluid received from the plunger assembly 706 and to return fluid to the plunger assembly 706. A fourth set of valves include a first valve 772 and a second valve 774 in fluid communication with the conduit 748 for cooperatively supplying brake fluid received from the plunger assembly 706 and to return fluid to the plunger assembly 706.

The plunger assembly 706 includes a motor 711 which rotates a ball screw mechanism 712. The ball screw mechanism 712 is threadably engaged with a plunger 714. The plunger 714 is slidably disposed in a bore 716 of a housing of the plunger assembly 706. A pair of seals 718 and 720 may be mounted in a groove formed in the bore 716 to sealingly engage with an outer cylindrical surface of the plunger 714. The bore 716, the seals 718 and 720, and the plunger 714 generally define a pressure chamber 722. The pressure chamber 722 is in fluid communication with the boost conduit 710. It should be understood that the plunger assembly 706 may be any suitable mechanism for driving a plunger or piston to provide a desired amount of fluid to the boost conduit 710. In the example schematically illustrated in FIG. 7, the motor 711 rotates the ball screw mechanism 712 in a first rotational direction or a second rotational direction. Rotation of the ball screw mechanism 712 causes axial movement of the plunger 714 along an axis 724. The plunger 714 may rotate about the axis 724 during axial movement or the plunger 714 may not rotate about the axis 724 during its travel. A sensor 713 may be used to detect the rotational position of the motor 711 and/or ball screw mechanism 712 which is indicative of the position of the plunger 714.

The following is a description of the operation of the brake system 700. FIG. 7 illustrates the brake system 700 and the brake pedal unit 792 in the rest position. In this condition, the driver is not depressing the brake pedal 42. Also in the rest condition, the simulation valve 74 may be energized or not energized. During a typical braking condition, the brake pedal 42 is depressed by the driver of the vehicle. The brake pedal 42 is coupled to the travel sensor 240 for producing a signal that is indicative of the length of travel of the input piston 34 and providing the signal to an electronic control module (not shown). The control module may include a microprocessor. The control module receives various signals, processes signals, and controls the operation of various electrical components of the brake system 700 in response to the received signals. The control module can be connected to various sensors such as pressure sensors, travel sensors, switches, wheel speed sensors, and steering angle sensors. The control module may also be connected to an external module (not shown) for receiving information related to yaw rate, lateral acceleration, longitudinal acceleration of the vehicle such as for controlling the brake system 700 during vehicle stability operation. Additionally, the control module may be connected to the instrument cluster for collecting and supplying information related to warning indicators such as ABS warning light, brake fluid level warning light, and traction control/vehicle stability control indicator light.

During a normal boost apply braking operation, the flow of pressurized fluid from the brake pedal unit 702 generated by depression of the brake pedal 42 is diverted into the internal pedal simulator assembly 100. The simulation valve 74 is actuated to divert fluid through the simulation valve 74 from the simulation chamber 144 to the reservoir 18. Also during the normal boost apply braking operation, the base brake valves 740 and 742 are energized to a secondary position to prevent the flow of fluid from the conduits 156 and 166 through the valves 740 and 742. Fluid flow is prevented from flowing from the ports 740a and 742a to the ports 740c and 742c, respectively. Thus, the fluid within the first and second output pressure chambers 198 and 228 of the brake pressure unit 20 are fluidly locked which generally prevents the first and second output pistons 38 and 40 from moving further. The brake pedal unit 702 may function in a similar manner as the brake pedal unit 20 described above with respect to the system 10 during normal boosted operation, manual push through, and loss of electrical power.

During normal braking operations (normal boost apply braking operation) the plunger assembly 706 provides individual pressure control for each of the wheel braes 16a-d. The plunger assembly 706 is preferably configured and operated by the electronic control unit (not shown) such that relatively small rotational increments of the motor 711 and/or ball screw mechanism 712 are obtainable. Thus, small volumes of fluid and relatively minute pressure levels are able to be applied and removed from the boost conduit 710. For example, the motor 711 may be actuated to turn 0.5 of a degree to provide a relatively small amount of fluid and pressure increase. This enables a multiplexing arrangement such that the plunger assembly 706 can be controlled to provide individual wheel pressure control. For example, if it is determined by the electronic control unit that the wheel brake 16a requires an increase in pressure, the first and second valves 764 and 766 can be actuated to their open positions. The remaining valves 760, 762, 768, 770, 772, and 774 are actuated to their closed positions. The plunger assembly 706 is then actuated to deliver the required pressure level into the wheel brake 16a via the boost conduit 710, the conduit 746, and a conduit 747. To maintain the pressure level within the wheel brake 16a, the first and second valves 764 and 766 can be actuated to their closed positions. To decrease the pressure within the wheel brake 16a, the motor 710 can be actuated into its opposite rotational direction and the first and second valves 764 and 768 are actuated accordingly. The plunger assembly 706 and the system 700 can be operated to provide individual control for the wheel brakes 16a-d as described above or can be used to control one or more wheel brakes 16a-d simultaneously by opening and closing the appropriate valves 760, 762, 764, 766, 768, 770, 772, and 774.

In one arrangement, the first and second valves for each wheel brake are operated simultaneously to their open or closed positions. Each of the pairs of first and second valves are in a parallel arrangement. For example, the first and second valves 764 and 766 are in a parallel arrangement relative to the conduits 746 and 747. It may be more cost effective to have two smaller valves actuated simultaneously compared to having a single valve but larger valve used in place of the first and second valves 746 and 766. However, it should be understood that a single valve may be used instead of the pair of valves. To provide the generally same volume and pressure flow, the pair of valves may have smaller springs with lower spring rates compared to the single valve configuration. This may reduce the overall cost as well as being a quieter system since the solenoid required to overcome the bias of the springs may be smaller.

As stated above, for a dual valve arrangement such as the first and second valves 764 and 766 controlling the wheel brake 16a, the valves 764 and 766 may be operated simultaneously to their open or closed positions. If desired, the valves 764 and 766 can be arranged within the system 700 such that the fluid flow through the valve is reversed for one of the valves relative to the other valve. The valves 764 and 766 may include a valve seat arrangement in which flow can flow through the valve seat in either of two directions. In the first direction, the fluid flows first through the valve seat and around the ball or valve member. In the second direction, the fluid flows first around the ball or valve member and then through the valve seat. Although the valves 764 and 766 may be generally identically structured, they may be situated within the housing of the hydraulic control unit 704 in a reversed manner. It has been found that the use of a pair of valves having smaller spring rates with a reverse flow arrangement provides better proportional control than a single larger spring valve. Proportional control is when a pressure increase or decrease is provided to more than wheel brake at a time, wherein the wheel brakes are at different pressures. Proportional control can be accomplished in the brake system 700 by using the plunger assembly 706 in cooperation with the respective first and second valves for a first wheel brake, and then simultaneously using only control of the respective first and second valves for a second wheel brake.

Referring to FIG. 7, the brake system 700 may further include a bleed valve, indicated generally at 730. The bleed valve 730 provides fluid fill and evacuation of the conduits and components of the hydraulic control unit 704 even when electrical power is not connected to the system 700. The bleed valve 730 includes a plunger 731 which is slidably disposed in a bore 732 of a housing. The plunger 731 includes a pin 733 which selectively lifts a ball 734 from a seat 735. The ball 734, or any other type of valve member, is biased against the seat 735 by a spring 736. The bore 732 defines a first chamber 737 and a second chamber 738. The valve seat 735 separates the first and second chamber 737 and 738. The first chamber 737 is in fluid communication with the chamber 722 of the plunger assembly 706 via a conduit 739. The second chamber 738 is in fluid communication with the conduit 748. The bleed valve 730 can be manually operated to move the plunger 731 such that the pin 733 lifts the ball 734 from the valve seat 735 against the bias of the spring 736. When lifted, fluid can flow through the bleed valve 730 to the various components and conduits.

Figure 10:
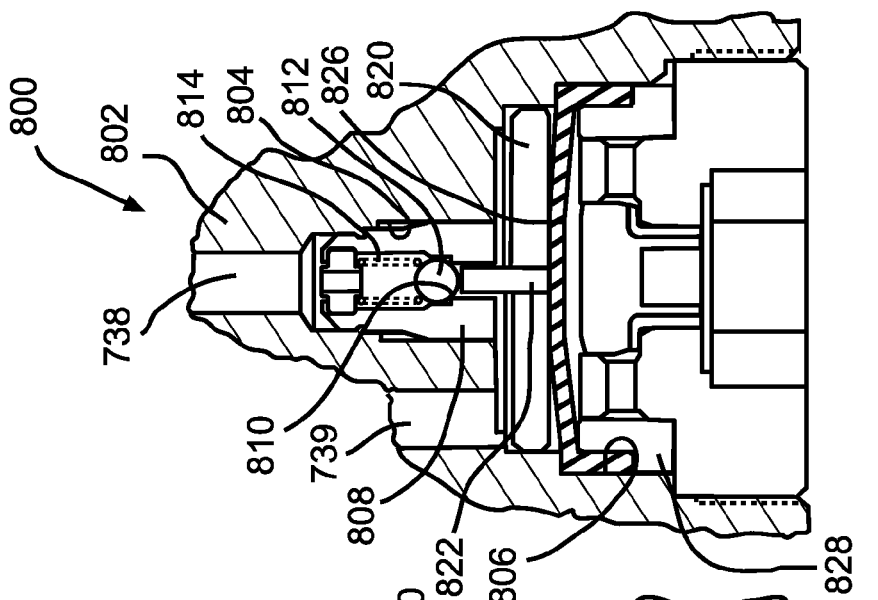
FIG. 10 is a cross-sectional view of the bleed valve of FIG. 8 shown in an operational lifted condition.
Figure 9:
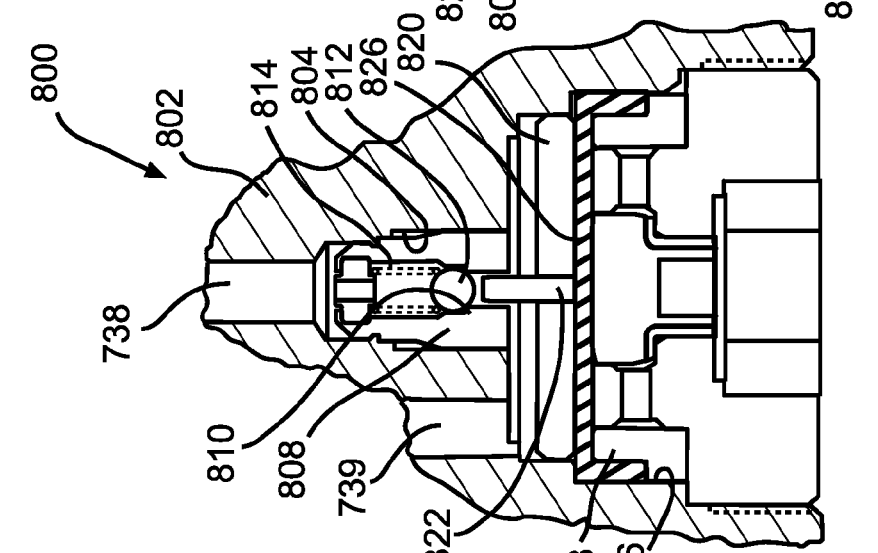
FIG. 9 is a cross-sectional view of the bleed valve of FIG. 8 shown in a normal operational state.
Figure 8:
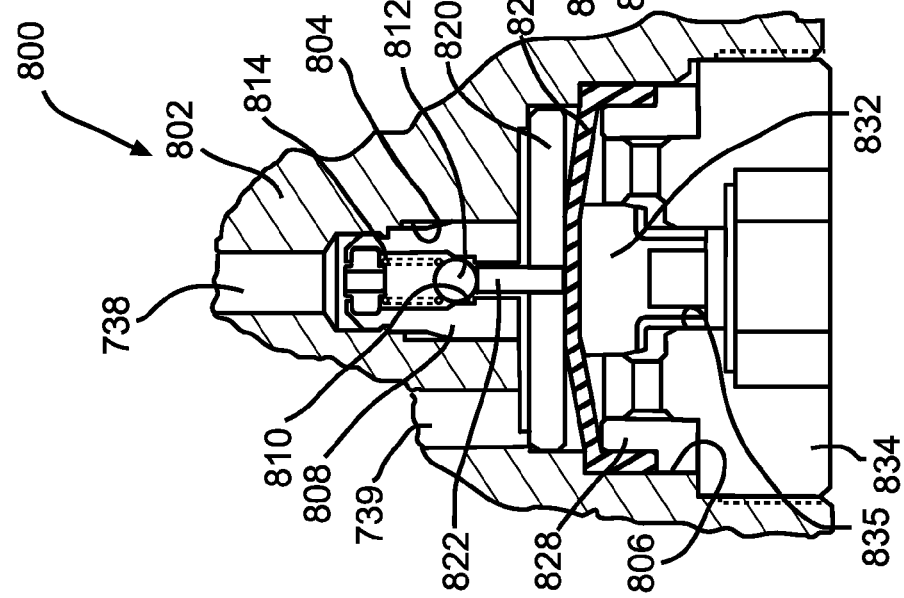
FIG. 8 is a cross-sectional view of an alternate embodiment of a bleed valve which may be used in the system illustrated in FIG. 7, wherein the bleed valve is shown in a shipped lifted condition.

There is illustrated in FIGS. 8 through 10, an alternate embodiment of a bleed valve, indicated generally at 800 which may be used for the bleed valve 730 of the brake system 700. Operation of the bleed valve 800 will be described as being used for the bleed valve 720 in the system 700 of FIG. 7. FIG. 8 illustrates the bleed valve 800 in a shipped condition in which the bleed valve is in an open position. FIG. 9 illustrates the bleed valve 800 is a normal state, such as during normal operation of the system 700, such that the bleed valve is in a closed position. FIG. 10 illustrates the bleed valve 800 in an operational lifted condition such that the bleed valve is in a open position.

The bleed valve 800 is mounted within a housing 802 which may be a portion of the housing of the hydraulic control unit 706. The housing 802 includes a stepped bore defining a first bore 804 and a second bore 806. A valve retainer 808 is disposed in the first bore 804. The retainer 808 houses a valve seat 810 and a ball 812 (or other suitable valve member). The ball 812 is movable between a position seated on the valve seat 810, as shown in FIG. 9, and an unseated position, as shown in FIGS. 8 and 10. The ball 812 is biases against the seat 810 by a spring 814 which is housed within the retainer 808. The bleed valve 800 further includes a disc shaped plunger 820 movably disposed in the second bore 806. The plunger 820 has an extension or pin 822 extended upwardly therefrom, as viewing FIGS. 8 through 10, for lifting or seating the ball 812. The bleed valve 800 further includes a rubber or elastomeric diaphragm 826 mounted in the second bore 806. The periphery of the diaphragm 826 is secured by a retainer 828. The center portion of the elastomeric diaphragm 826 is flexible enough to be able to be stretched as shown in FIGS. 8 and 10. The plunger 820 may be connected to the center of the diaphragm 826. A movable lift member 832 is movably mounted within a threaded plug 834 closing off the second bore 806. The lift member 832 may be lifted and secured in the various positions by any suitable manner, such as by a press fit, threaded connection or any other suitable positional connection. The first bore 804 is in fluid communication with the conduit 738. The second bore 806 is in fluid communication with the conduit 739.

During shipment and prior to installation of the bleed valve 800, the lift member 832 may be placed at its upward position, as shown in FIG. 8, to stretch the diaphragm upwardly such that the pin 822 lifts the ball 812 permitting flow to flow between the conduits 738 and 739. For example, the lift member 832 may be press fit within a central bore 835 of the plug 834 to its position as shown in FIG. 8. The force of the press fit may be such that it retains the lift member 832 at the position shown in FIG. 8 during shipment, but after evacuation and fill of the system 700, pressure acting on the diaphragm 826 moves the lift member 832 to its normal operational position shown in FIG. 9. This press fit has the advantage that the bleed vale 800 need not be manually switched into its operational state. After installation and reseated, the movement of the diaphragm 826 helps prevent air from being pulled into the system 700 due to the flexible nature of the diaphragm. Note that the lift member 832 may include slots or ribs formed therein to permit a vent to atmosphere underneath the diaphragm 826. Additionally, the housing 802, retainer 828 and the plug 834 may have features formed therein to permit the vent to atmosphere.

FIG. 9 illustrates the bleed valve 800 in its normal state. In the normal state, the pin 822 is retracted downwardly such that the spring 814 biases the ball 812 against the seat 810, thereby closing of the bleed valve 800. Thus, flow is restricted from flowing between the conduits 738 and 739. To prevent a vacuum condition in the pressure chamber 722 of the plunger assembly 706, the diaphragm 826 is free to stretch to a position as shown in FIG. 10 caused by the decrease in pressure or vacuum within the conduit 739 in fluid communication with the chamber 722 of the plunger assembly 706. When the diaphragm is moved to the lifted condition as shown in FIG. 10, the pin 822 unseats the ball 812 from the seat 810, thereby permitting the flow of fluid from the conduit 738 to the conduit 739.

Although the brake system 700 is described above with respect to a multiplexing control such that each wheel brake may be individually controlled by the plunger assembly 706, a system having a plunger assembly can be configured without having multiplexing capabilities. The plunger assembly may be used to provide a source of pressurized fluid at a desired boost pressure level, instead of being used to provide pressure control for each of the wheel brakes. For example, there is illustrated in FIG. 10 a fourth embodiment of a brake system, indicated generally at 900. The brake system 900 may be similar in some structure and function as the brake system 700 described above. The system 900 generally includes a brake pedal unit assembly 902, a hydraulic control unit 904, a slip control unit 907, and the wheel brakes 16a-d. The brake pedal unit assembly 902 may function in a similar manner as the brake pedal unit assembly 12 and 702. Therefore, like numbers will be used to describe similar components. The brake pedal unit assembly 902 provides a pedal simulator function as well as providing for a manual push through operation under certain failed conditions.

Figure 11:
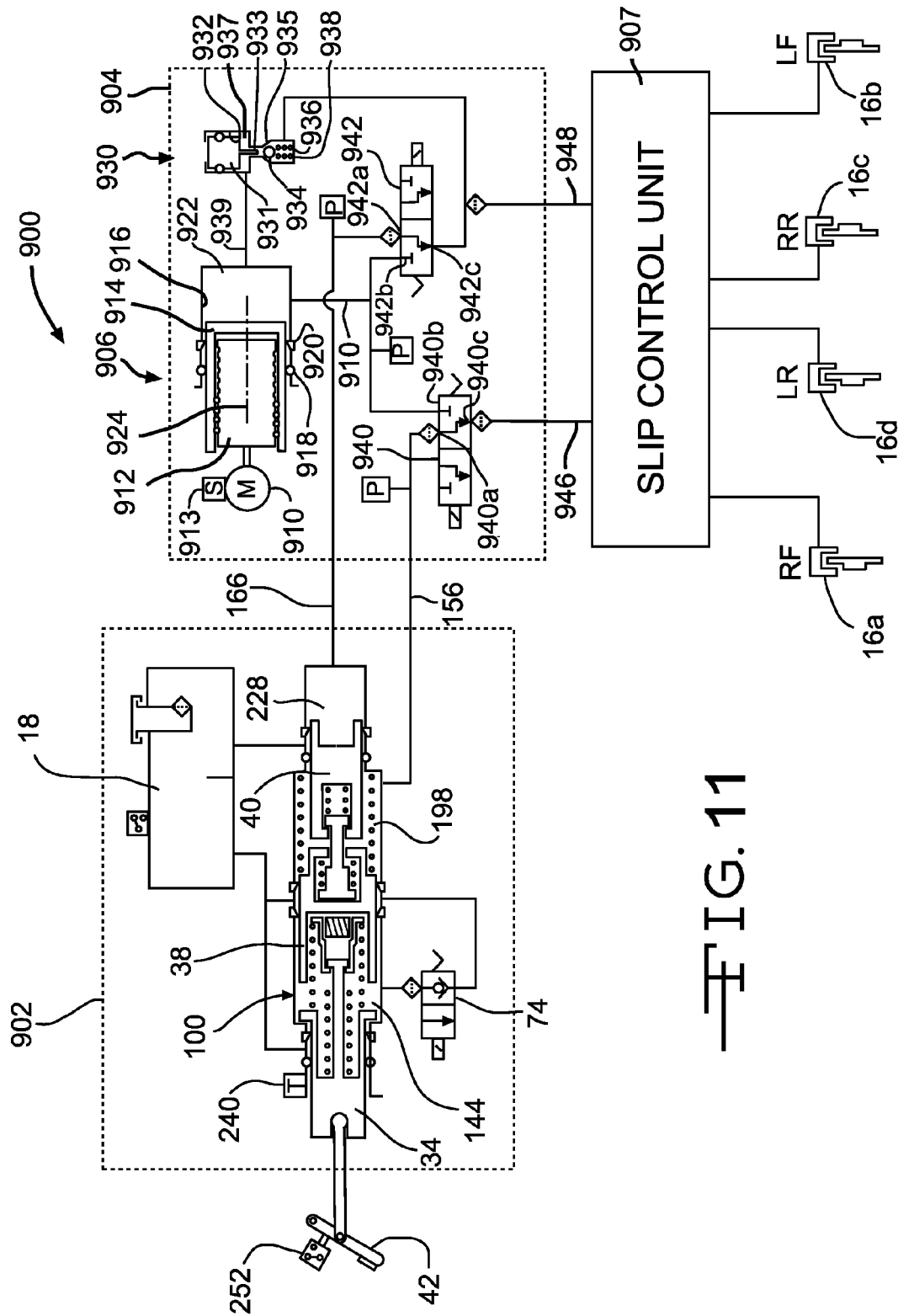
FIG. 11 is a schematic illustration of a fourth embodiment of a brake system.

The system 900 may include a travel sensor, schematically shown at 240 in FIG. 11, for producing a signal that is indicative of the length of travel of the input piston 34 which is indicative of the pedal travel. The system 700 may also include a switch 252 for producing a signal for actuation of a brake light and to provide a signal indicative of movement of the input piston 34.

The system 900 further includes a first base brake valve 940 and a second base brake valve 942 (or referred to as switching valves or switching valve arrangement). The base brake valves 940 and 942 may be solenoid actuated three way valves. The base brake valves 940 and 942 are generally operable to two positions, as schematically shown in FIG. 11. The first base brake valve 940 has a port 940a in fluid communication with the primary output conduit 156 which is in fluid communication with the first output pressure chamber 198. A port 940b is in fluid communication with a boost conduit 910. A port 940c is in fluid communication with a conduit 946 which is selectively in fluid communication with the wheel brakes 16a and 16d via the slip control unit 907. The second base brake valve 942 has a port 942a in fluid communication with the conduit 166 which is in fluid communication with the second output pressure chamber 228. A port 942b is in fluid communication with the boost conduit 910. A port 942c is in fluid communication with a conduit 948 which is selectively in fluid communication with the wheel brakes 16b and 16c via the slip control unit 907.

The hydraulic control unit 904 includes a plunger assembly, indicated generally at 906. The plunger assembly 906 includes a motor 910 which rotates a ball screw mechanism 912. The ball screw mechanism 912 is threadably engaged with a plunger 914. The plunger 914 is slidably disposed in a bore 916 of a housing of the plunger assembly 906. A pair of seals 918 and 920 may be mounted in a groove formed in the bore 916 to sealingly engage with an outer cylindrical surface of the plunger 914. The bore 916, the seals 918 and 920, and the plunger 914 generally define a pressure chamber 922. The pressure chamber 922 is in fluid communication with the boost conduit 910. It should be understood that the plunger assembly 906 may be any suitable mechanism for driving a plunger or piston to provide a desired amount of fluid to the boost conduit 910. In the example schematically illustrated in FIG. 11, the motor 910 rotates the ball screw mechanism 912 in a first rotational direction or a second rotational direction. Rotation of the ball screw mechanism 912 causes axial movement of the plunger 914 along an axis 924. The plunger 914 may rotate about the axis 924 during axial movement or the plunger 914 may not rotate about the axis 924 during its travel. A sensor 913 may be used to detect the rotational position of the motor 910 and/or ball screw mechanism 912 which is indicative of the position of the plunger 914.

The brake system 900 may further include a bleed valve, indicated generally at 930. The bleed valve 930 provides fluid fill and evacuation of the conduits and components of the hydraulic control unit 904 even when electrical power is not connected to the system 900. The bleed valve 930 includes a plunger 931 which is slidably disposed in a bore 932 of a housing. The plunger 931 includes a pin 933 which selectively lifts a ball 934 from a seat 935. The ball 934, or any other type of valve member, is biased against the seat 935 by a spring 936. The bore 932 defines a first chamber 937 and a second chamber 938. The valve seat 935 separates the first and second chamber 937 and 938. The first chamber 937 is in fluid communication with the chamber 922 of the plunger assembly 906 via a conduit 939. The second chamber 938 is in fluid communication with the conduit 948. The bleed valve 930 can be manually operated to move the plunger 931 such that the pin 933 lifts the ball 934 from the valve seat 935 against the bias of the spring 936. When lifted, fluid can flow through the bleed valve 930 to the various components and conduits.

The slip control unit 907 can be any suitable arrangement, such as a conventional anti-lock brake unit, that can be added to the system 900. Over the years, slip control units have decreased in price. Instead of mounting the various components of a slip control unit into the hydraulic control unit 904, it may be less expensive to add it remotely, as schematically illustrated in FIG. 11. The conduits 946 and 948 may be used hydraulically connect the blocks of the hydraulic control unit 904 and the slip control unit 907 which may be located remotely from one another, or alternatively, may be connected together.

Figure 12:
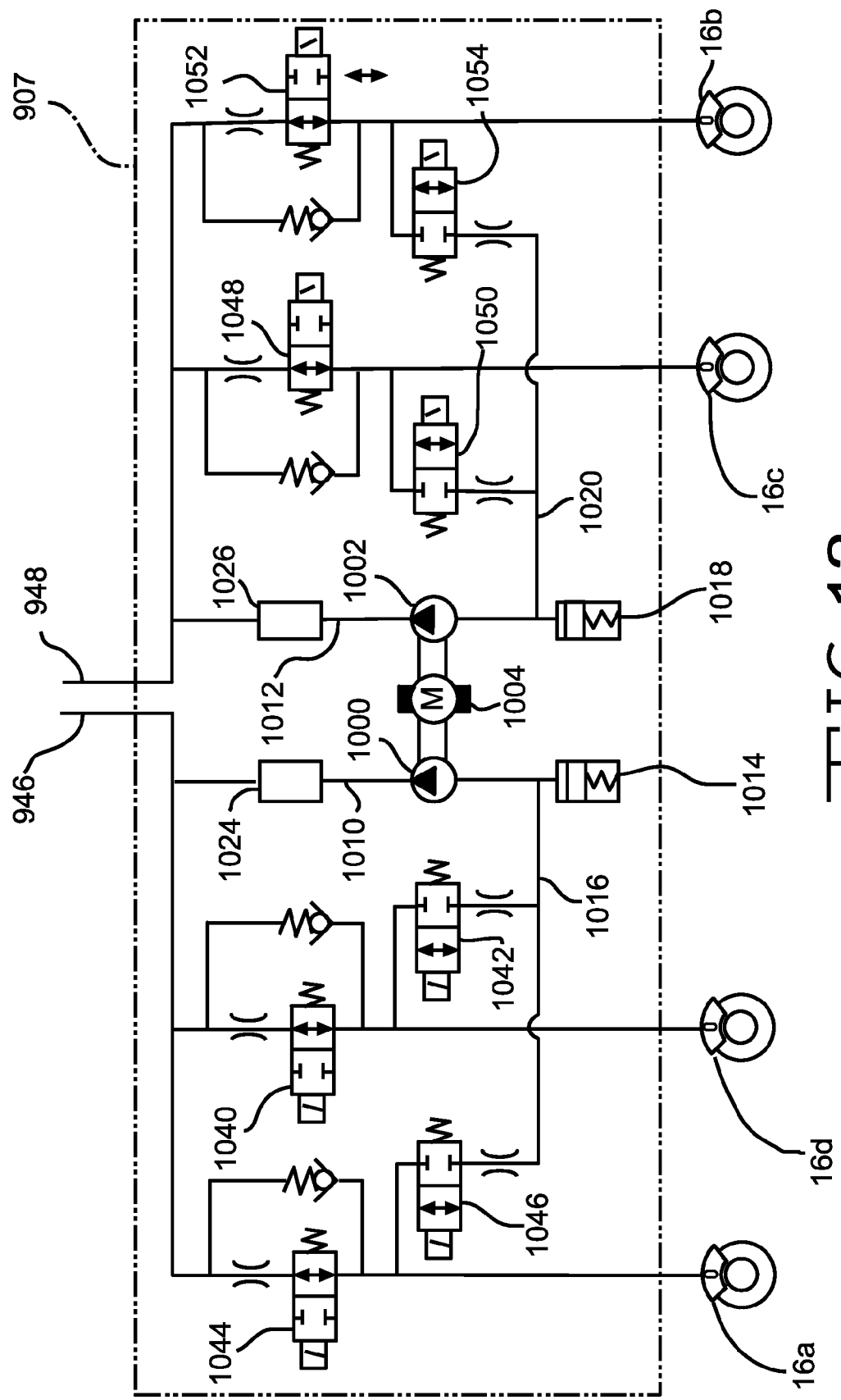
FIG. 12 is a schematic illustration of an add-on clip control unit which may be used in the brake circuit of FIG. 11.

There is illustrated in FIG. 12 an example of the slip control unit 907 which may be used in the system 900. The slip control unit 907 includes first and second pumps 1000 and 1002 which may be operated by a single motor 1004 or by multiple motors (not shown). The pump 1000 provides pressurized fluid to an output conduit 1010. The pump 1002 provides pressurized fluid to an output conduit 1012. The inlet of the pump 1000 is in fluid communication with a reservoir or low pressure accumulator 1014 via a return conduit 1016. The inlet of the pump 1002 is in fluid communication with a reservoir or low pressure accumulator 1018 via a return conduit 1020. The output conduits 1010 and 1012 may include damping chambers 1024 and 1026, respectively, mounted thereon to reduce noise and fluid vibrations.

The slip control unit 907 further includes various valves (slip control valve arrangement) for permitting controlled braking operations, such as ABS, traction control, vehicle stability control, and regenerative braking blending. A first set of valves includes an apply valve 1040 and a dump valve 1042 in fluid communication with the conduit 946 for cooperatively supplying brake fluid received from the plunger assembly 906 (or brake pedal unit 902 during a manual push through mode) to the wheel brake 16*d*, and for cooperatively relieving pressurized brake fluid from the wheel brake 16*d* to the return conduit 1016. A second set of valves include an apply valve 1044 and a dump valve 1046 in fluid communication with the conduit 946 for cooperatively supplying brake fluid received from the plunger assembly 906 (or brake pedal unit 902 during a manual push through mode) to the wheel brake 16*a*, and for cooperatively relieving pressurized brake fluid from the wheel brake 16*a* to the return conduit 1016. A third set of valves include an apply valve 1048 and a dump valve 1050 in fluid communication with the conduit 948 for cooperatively supplying brake fluid received from the plunger assembly 906 (or brake pedal unit 902 during a manual push through mode) to the wheel brake 16*c*, and for cooperatively relieving pressurized brake fluid from the wheel brake 16*c* to the return conduit 1020. A fourth set of valves include an apply valve 1052 and a dump valve 1054 in fluid communication with the conduit 948 for cooperatively supplying brake fluid received from the plunger assembly 906 (or brake pedal unit 902 during a manual push through mode) to the wheel brake 16*d*, and for cooperatively relieving pressurized brake fluid from the wheel brake 16*d* to the return conduit 1020.

The following is a description of the operation of the brake system 900. FIG. 11 illustrates the brake system 900 and the brake pedal unit 902 in the rest position. In this condition, the driver is not depressing the brake pedal 42. Also in the rest condition, the simulation valve 74 may be energized or not energized. During a typical braking condition, the brake pedal 42 is depressed by the driver of the vehicle. The brake pedal 42 is coupled to the travel sensor 240 for producing a signal that is indicative of the length of travel of the input piston 34 and providing the signal to an electronic control module (not shown). The control module may include a microprocessor. The control module receives various signals, processes signals, and controls the operation of various electrical components of the brake system 900 in response to the received signals. The control module can be connected to various sensors such as pressure sensors, travel sensors, switches, wheel speed sensors, and steering angle sensors. The control module may also be connected to an external module (not shown) for receiving information related to yaw rate, lateral acceleration, longitudinal acceleration of the vehicle such as for controlling the brake system 900 during vehicle stability operation. Additionally, the control module may be connected to the instrument cluster for collecting and supplying information related to warning indicators such as ABS warning light, brake fluid level warning light, and traction control/vehicle stability control indicator light.

During a normal boost apply braking operation, the flow of pressurized fluid from the brake pedal unit 902 generated by depression of the brake pedal 42 is diverted into the internal pedal simulator assembly 100. The simulation valve 74 is actuated to divert fluid through the simulation valve 74 from the simulation chamber 144 to the reservoir 18. Also during the normal boost apply braking operation, the base brake valves 940 and 942 are energized to a secondary position to prevent the flow of fluid from the conduits 156 and 166 through the valves 940 and 942. Fluid flow is prevented from flowing from the ports 940*a* and 942*a* to the ports 940*c* and 942*c*, respectively. Thus, the fluid within the first and second output pressure chambers 198 and 228 of the brake pressure unit 20 are fluidly locked which generally prevents the first and second output pistons 38 and 40 from moving further. The brake pedal unit 902 may function in a similar manner as the brake pedal unit 20 described above with respect to the system 10 during normal boosted operation, manual push through, and loss of electrical power.

During normal braking operations (normal boost apply braking operation) the plunger assembly 906 is not used for multiplexing as the plunger assembly 706. Instead, the plunger assembly 906 provides a desired level of boost pressure to the boost conduit 910. The plunger assembly 906 can be controlled to alter the pressure within the boost conduit 910. The apply and dump valves of the slip control unit 907 may function in a similar manner as described above with the respect to the apply and dump valves of the system 10 of FIG. 1. The apply and dump valves of the slip control unit 907 are actuated to provide a desired pressure level to the wheel brakes 16*a-d*. The pumps 1000 and 1002 of the slip control unit 907 can supply fluid to the plunger assembly 906 if needed such as when the plunger 914 is at or near a full stroke. In this situation, fluid from the pumps 1000 and/or 1002 is supplied to the conduits 946 and/or 948 to replenish the pressure chamber 922 as the plunger is actuated back towards it initial or non-stroked position. This occasion may occur when the system 900 is undergoing a relatively large anti-lock braking event in which the plunger has been near or fully stroked and the system 900 still requires pressure to the conduits 946 and 948.

Figure 13:
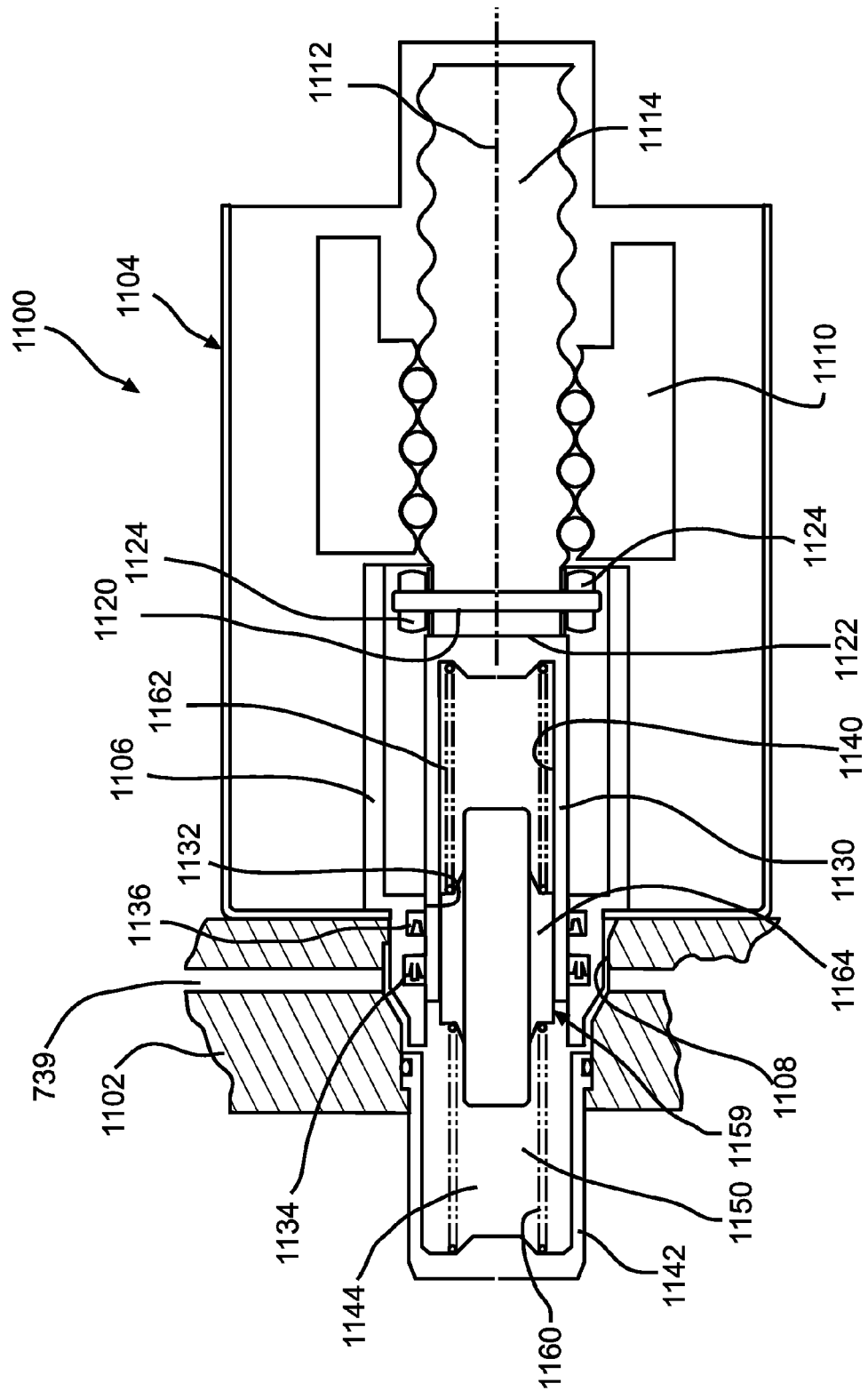
FIG. 13 is cross-sectional view of an alternate embodiment of a plunger assembly.

There is schematically illustrated in FIG. 13 an alternate embodiment of a plunger assembly, indicated generally at 1100 that may be used for the plunger assemblies 706 or 906 with respect to the systems 700 and 900, respectively, described above. The plunger assembly 100 is mounted in a housing 1102, such as the housing of the hydraulic control unit 704, or a housing separate therefrom. The plunger assembly 1100 includes a motor, indicated generally at 1104. The motor 1104 is mounted on a second housing or stem 1106. The stem 1106 includes a first end that is disposed in a bore 1108 of the housing 1102. The motor 1104 includes windings for rotating a nut 1110 when the motor is actuated. The nut 1110 rotates about an axis 1112. The nut 1110 is threadably engaged with a screw member 1114. The nut 1110 and the screw member 1114 function as a ball screw mechanism such that rotation of the nut 1110 causes linear movement of the screw member 1114 along the axis 1112. The screw member 1114 preferably does not rotate relative to the axis 1112. This can be accomplished by any suitable manner. In the embodiment illustrated in FIG. 13, a pin 1120 is inserted through a first end 1122 of the screw member 1114. Rollers 1124 are mounted on the ends of the pin 1120. The rollers 1124 can be disposed in tracks that extend in a direction parallel to the axis 1112. The rollers 1124 and the tracks cooperate to prevent rotation of the screw member 1114 as it is being driven by the nut 1110.

The first end 1122 of the screw member 1114 engages with and pushes against a plunger 1130. The plunger 1130 is slidably disposed in a bore 1132 formed in the stem 1106. A pair of seals 1134 and 1136 is disposed in grooves formed in the bore 1132 and sealingly engage with an outer cylindrical surface of the plunger 1130. The plunger 1130 includes a cavity 1140. A cup-shaped retainer or plug 1142 closes off one end of the bore 1108 of the housing 1102. The plug 1142 includes a cavity 1144. A pressure chamber 1150 is generally defined by the housing 1102, the cavity 1140 of the plug 1142, the cavity 1144 of the plunger 1130, and the seals 1134 and 1136. The pressure chamber 1150 is in fluid communication with an output conduit such as the conduit 739 of the system 700.

The plunger assembly 110 includes a spring assembly, indicated generally at 1159, including a first spring 1160, a second spring 1162, and a slider piston 1164. The spring assembly 1159 is generally housed with the cavity 1140 of the plug 1142 and the cavity 1144 of the plunger 1130. The spring assembly 1159 biases the plunger 1130 against the screw member 1114. Although a single spring could be used instead of the spring assembly 1159, the spring assembly 1159 has the advantage of less chance of buckling compared to a single elongated spring.

The plunger assembly 1100 can be used for multiplexing or for non-multiplexing as described above with respect to the systems 700 and 900. To actuate the plunger assembly 1100 to provide pressure to the conduit 739, power is provided to the motor 1104 which causes rotation of the nut 1110. Rotation of the nut 1110 causes linear motion of the screw member 1114 in the left-hand direction as viewing FIG. 13. During linear movement of the screw member 1114, the rollers 1124 roll along the tracks to prevent the screw member from rotating relative to the axis 1112. Movement of the screw member 1114 pushes against the plunger 1130 to pressurize the pressure chamber 1144.

Although a single seal may be used instead of the seals 1134 and 1136, the seals 1134 and 1136 may be configured such that the seal 1134 functions as a check valve and the seal 1136 function as an accumulator during use of the plunger assembly 1100. The groove from the seal 1136 may be slightly larger to accommodate slight movement of the seal 1136 within the groove.

The cup-shaped plug 1142 is advantageously used to reduce the size of the housing 1102. Alternatively, the plug 1142 could be replaced with a larger housing having a portion for retaining the spring assembly 1159 and the plunger 1130 during a full stroke.

Figure 14:
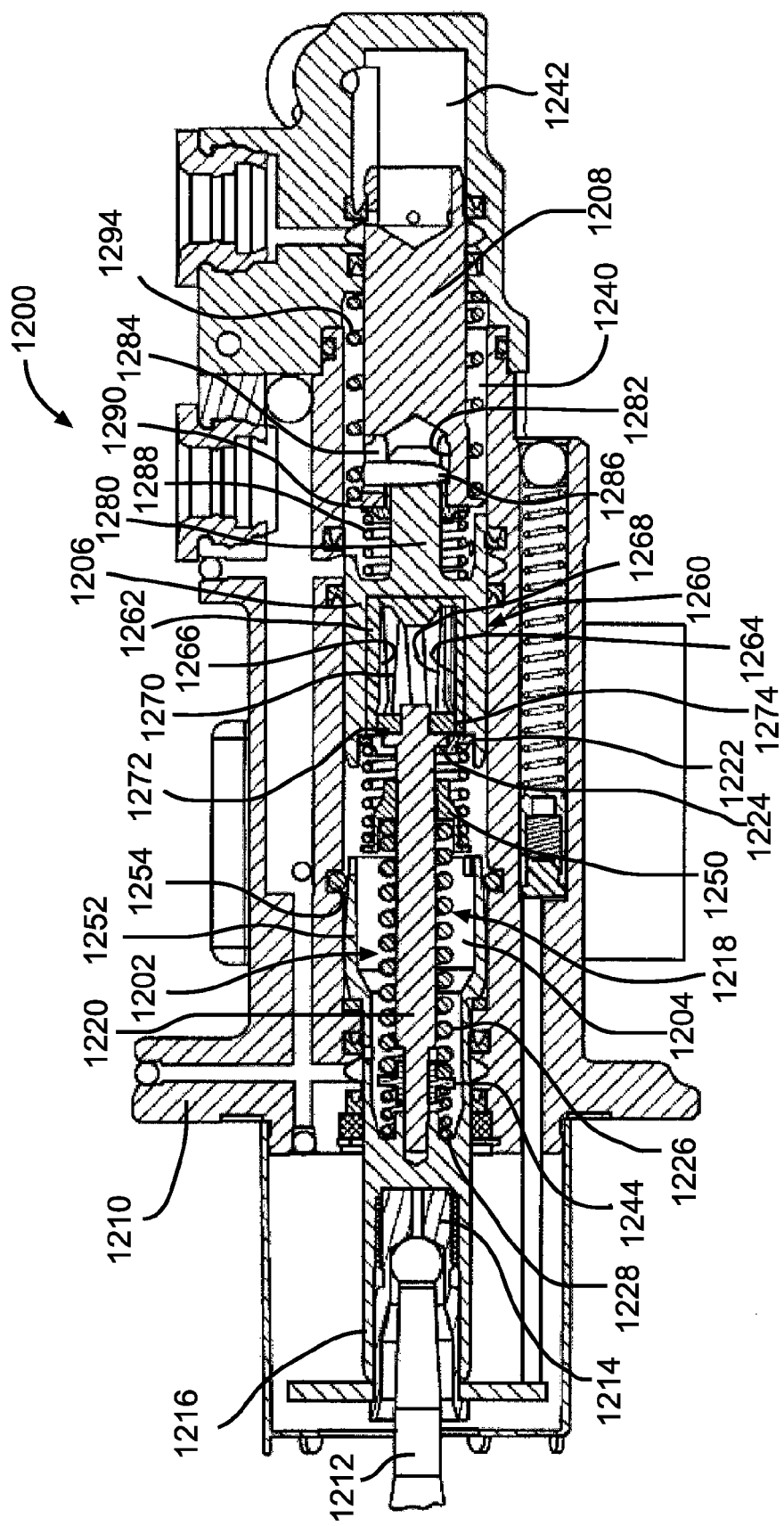
FIG. 14 is a cross-sectional view of an alternate embodiment of a brake pedal unit.

There is illustrated in FIG. 14 an alternate embodiment of a brake pedal unit, indicated generally at 1200. The brake pedal unit 1200 is similar in structure and function as the brake pedal units described above. Thus, like components will not be discussed in detail herein and it should be understood that features of the brake pedal units described above may be already shown in the brake pedal unit 1200 or may be added thereto. The brake pedal unit 1200 includes a pedal simulator, indicated generally at 1202. The pedal simulator 1202 includes a simulation chamber 1204 which is in selective fluid communication with a reservoir (not shown) via a simulation valve (not shown). The pedal simulator 1202 includes a pair of axially aligned nested output pistons 1206 and 1208. The brake pedal unit 1200 includes a housing 1210, an input rod 1212, a coupler 1214, an input piston 1216, a caged spring assembly 1218 having a pin 1220, retainer 1222, a low rate simulator spring 1224, and a high rate simulator spring 1226. To create a different spring rate characteristic, the pedal simulator 1202 may include an additional spring 1228 (knee point spring) which may have a different spring rate than the springs 1226 and 1224. The springs 1226, 1228, and 1224 may be preloaded when the brake pedal unit 1200 is in a rest mode when pressure is not generated in the pedal simulator 1202 or first and second output chambers 1240 and 1242. The springs 1226 and 1228 act against one another via a first separator member or sleeve 1244 disposed therebetween. The sleeve 1244 is slidably mounted on the pin 1220. The springs 1226 and 1224 act against one another via a separator member 1250.

Figure 15:
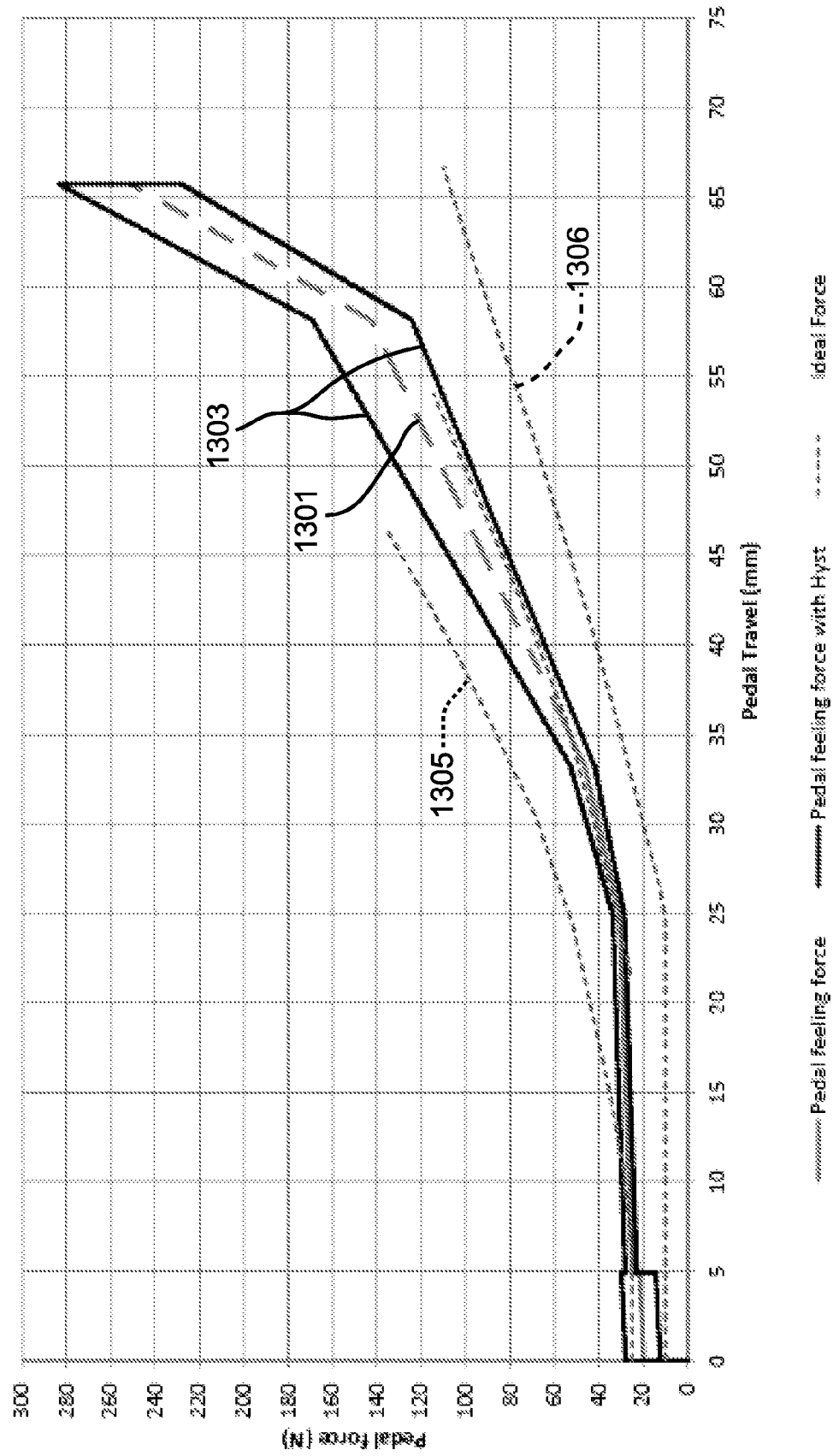
FIG. 15 is a graphical representation of hysteresis within a pedal simulator during a generally slow apply.

The brake pedal unit 1200 may include an optional force hysteresis feature which provides a desired lag or differential in the expected output force of the springs of the pedal simulator 1202 during actuation (apply) and retraction (return) of the brake pedal during actuation of the pedal simulator 1202 under a normal boosted condition. The hysteresis can be caused by frictional contact of one or more of the pistons of the pedal simulator 1202 as the piston(s) travel or advanced in the pedal simulator. The frictional forces can be from the sliding contact of various seals within the pedal simulator. There is illustrated in FIG. 15 a graphical representation of an example of hysteresis within a pedal simulator during a generally slow apply. The horizontal axis relates to the pedal travel, such as the travel experienced by the brake pedal as the driver presses on the brake pedal. The vertical axis relates to the pedal force acting back on the brake pedal during the length of travel of the brake pedal. Line 1301 represents a pedal feeling force of a pedal simulator having no hysteresis. Lines 1303 represent a pedal feeling force with a pedal simulator having force hysteresis, wherein the lines 1303 illustrate the forward motion and retraction motion of the brake pedal. As shown, the lines 1303 there is a lag or differential between the apply stroke and the return stroke. Lines 1305 and 1306 represent the bounds or limits of what may be generally considered to be an acceptable pedal feel during a slow apply and release.

Force hysteresis may be from frictional forces as the input piston 1216 travels or advances within the brake pedal unit 1200. The force hysteresis can include a fixed damping in which the damping forces are dependent and not independent of the rate of travel of the input piston 1216 and independent on the travel position. Alternatively, the force hysteresis may have a changing or progressive rate of frictional contact relative to travel of the input piston 1216. Force hysteresis can be accomplished by any suitable manner. In the embodiment of the brake pedal unit 1200 shown in FIG. 14, a progressive force hysteresis is provided by having a sloped or frustoconical surface 1252 on the input piston 1216 which frictionally engages with an elastomeric member or O-ring 1254. As the input piston 1216 is advanced, the O-ring inner diameter expands by the increasing diameter of the advancing input piston 1216 which increases the frictional forces of the O-ring 1254 against the frustoconical surface 1252 of the input piston 1216.

Although the brake pedal unit 1200 would generally only have one force hysteresis feature, the brake pedal unit 1200 is illustrated with a second progressive rate force hysteresis feature in the form of a friction generating mechanism, indicated generally at 1260. The friction generated mechanism 1260 includes an elastomeric member or cup 1262 which is mounted within a recess 1264 formed in the first output piston 1206. The cup 1262 includes a bore 1266 having an inner wall 1268. Optionally, the inner wall 1268 includes a plurality of radially inwardly extending ribs 1270. The ribs 1270 may be formed such that they are sloped relative to the axial direction of the movement of the output pistons 1206 and 1208 such that the inner diameter or distance between the plurality of ribs 1270 decreases as moving rightward as viewing FIG. 14. The inner wall 1268 or the ribs 1270 define engagement surfaces that contact with a sliding member or washer 1272 slidably disposed within the bore 1266 of the cup 1262. The washer 1272 is mounted on the end of the pin 1220 and moves therewith. The washer 1272 has an outer cylindrical surface 1274 which defines an engagement surface. During operation of the pedal simulator 1202, the washer 1272 advances into the bore 1266 of the cup 1262. Due to the sloped engagement surfaces of the ribs 1270, the rate of friction force build-up is increased, preferably in a progressive manner, as the input piston 1216 moves towards the first output piston 1208. The deformation of the ribs 1270 as the washer 1272 slides in the bore 1266 results in the increased frictional forces. The cross-sectional profile or slopes of the ribs 1270 can be configured or shaped to provide a desired progressive hysteresis such that there is increased friction with an increase in travel of the input piston 1216.

Another difference between the brake pedal unit 2300 and the other brake pedal units described herein is the type of mechanical connection between the first and second output pistons 1206 and 1208. The first and second output pistons 1206 and 1208 are mechanically connected together such that there is limited play or movement between the pistons 1206 and 1208. This type of connection permits the first and second output pistons 1206 and 1208 to move relative to one another by a relatively short distance to compensate for pressure and/or volume differences in their respective output circuits. As described above, it may be desirable under certain failure modes that the second output piston 1208 is connected to the first output piston 1206.

As shown in FIG. 14, the first output piston 1208 includes an extension 1280 which is partially received in a recess 1282 formed in the second output piston 1208. The second output piston 1208 includes an axially extending slot 1284 in communication with the recess 1282. A pin 1286 is mounted on the extension 1280 in a preferably fixed arrangement and extends through the slot 1284. The brake pedal unit 1200 is shown in its rest mode in FIG. 14 when pressure is not generated in the pedal simulator 1202, the first output chamber 1240, and the second output chamber 1242. It is noted that the pin 1286 is centrally located within the slot 1284, i.e., the pin 1284 does not abut against either of the ends of the slot 1284. The brake pedal unit 1200 further includes a spring 1288 which acts on the right-hand end of the first output piston 1206 and against a spring retainer sleeve or washer 1290. The washer 1290 is slidably mounted on the extension 1280. The washer 1290 includes an end which abuts the pin 1286. In the rest mode, the spring 1288 pushes the washer against the end of the second output piston 1208. The washer 1290 is dimensioned such that the end of the washer 1290 positions the pin 1286 within the central or middle portion of the slot 1284. The spring force of the spring 1288 is preferably greater than the spring force of a return spring 1294 which biases the second output piston 1208 towards the first output piston 1206.

Figure 16:
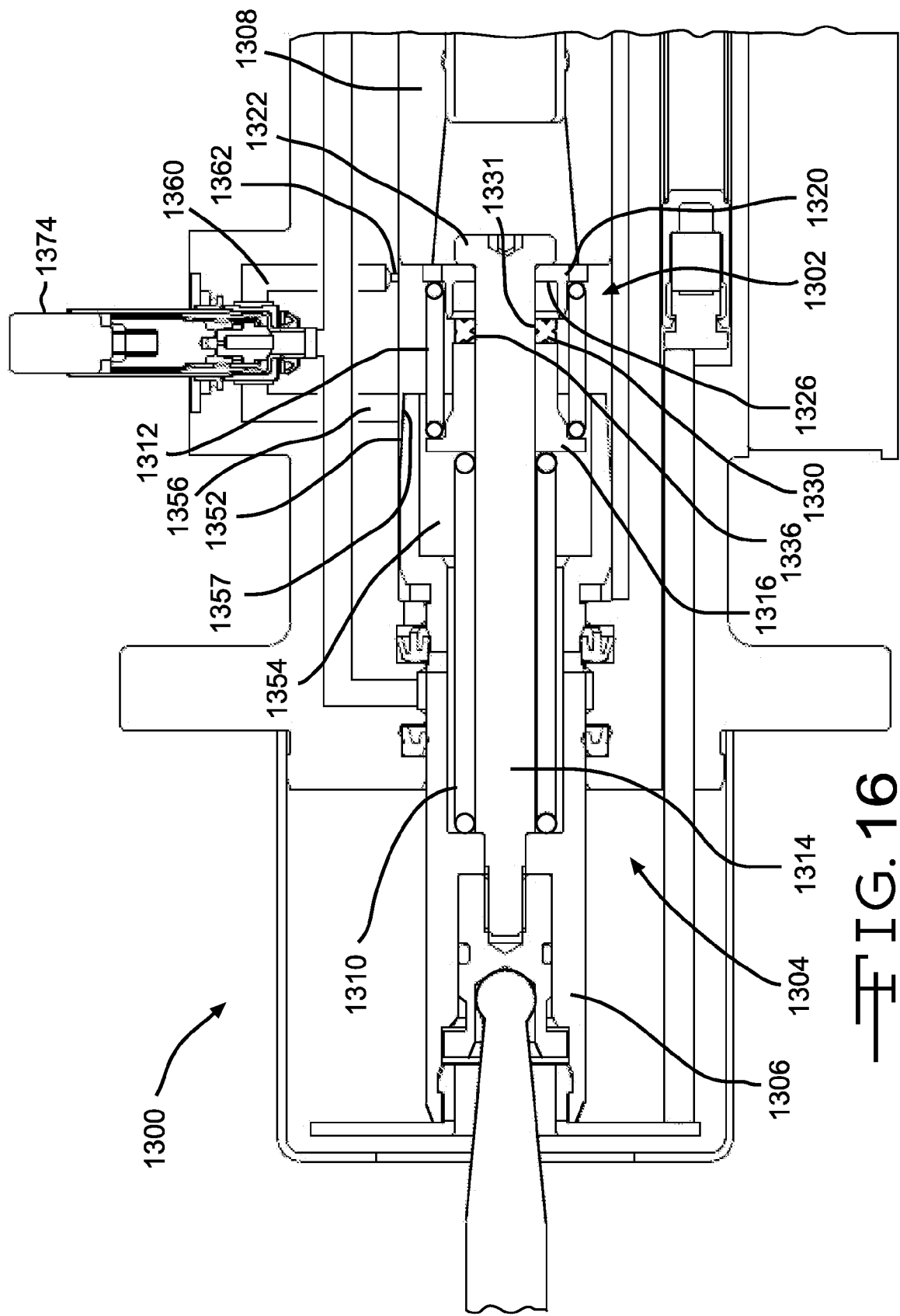
FIG. 16 is a cross-sectional view of portion of an alternate embodiment of a brake pedal unit.

There is illustrated in FIG. 16 a portion of another alternate embodiment of a brake pedal unit, indicated generally at 1300. The brake pedal unit 1300 is similar in structure and function as the brake pedal units described above. Thus, like components will not be discussed in detail herein and it should be understood that features of the brake pedal units described above may be already shown in the brake pedal unit 1200 or may be added thereto.

The brake pedal unit 1300 includes another example of a force hysteresis feature in the form of a compression mechanism, indicated generally at 1302. The brake pedal unit 1300 includes a pedal simulator, indicated generally at 1304, disposed between an input piston 1306 and a primary piston 1308. The pedal simulator includes a caged spring assembly including a first spring 1310, a second spring 1312, an elongated pin 1314 connected to and extending from the input piston 1306. A retainer 1316 is slidably disposed on the pin 1314 and is engaged with both of the springs 1310 and 1312. An end member 1320 is biased by the springs 1310 and 1312 against a circular flange 1322 of the pin 1314. The end member 1320 includes an annular recess 1326. A contact member or an elastomeric member, such as a quad ring 1330, is disposed about the pin 1314 and is adjacent an end wall 1336 of the retainer 1316.

During actuation of the pedal simulator 1304, the input piston 1306 advances towards the primary piston 1308. During this movement, the springs 1310 and 1312 are compressed which also causes the retainer 1316 to slide along the pin 1314 and move in a direction towards the primary piston 1308. Further movement of the retainer 1316 will frictionally slide the quad ring 1330 into the recess 1326 of the end member. After being disposed in the recess 1326, the end wall 1336 of the retainer 1316 continues to push against the flexible quad ring, thereby forcing a compression of the quad ring 1330 into the area of the recess 1326. The inner diameter surface 1331 of the quad ring 1330 is forced against the surface of the pin 1314. One of the advantages of the compression mechanism 1302 is that during the compression of the quad ring 1330, there is a minute amount of friction between the retainer and the end member, and during the compression, the quad ring behaves similar to hydraulic fluid, pressure loading it against the moving pin to create the desired friction force.

The brake pedal unit 1300 also includes an example of progressive damping feature which impedes the advancement of the input piston 1306 as the input piston 1306 is advanced in the pedal simulator. The progressive damping feature provides a desired increased hysteresis and pedal apply force especially during spike or very rapid apply. The input piston 1306 includes one or more sloped or frustoconical surfaces 1352 along its length. A simulation chamber 1354 is in fluid communication with a conduit 1356 at an orifice 1357. The conduit 1356 is in fluid communication with a simulation valve 1358. The conduit 1356 is in fluid communication with a conduit 1360 having a fixed restricted (reduced diameter) orifice 1362. The orifice 1362 is in fluid communication with the simulation chamber 1354. In the embodiment shown, the orifice 1356 is larger in cross-sectional area compared to the fixed orifice 1362. It should be understood that the orifices 1357 and 1362 may be sized to any suitable cross-sectional area. The flow rate through the orifice 1357 also depends on the location of the input piston 1306 due to the frustoconical surface 1352 in proximity to the opening of the orifice 1357.

During a normal boost event in which the pedal simulator is actuated, the input piston 1306 moves rightward, as viewing FIG. 16. Various springs of the pedal simulator assembly are compressed, thereby providing a feedback force to the driver of the vehicle. In a spike apply in which the driver presses on the brake pedal in a rapid and forceful manner, the fixed orifice 1362 restricts the flow of fluid between the simulation chamber 1354 and the reservoir, thereby impeding advancement of the input piston 1334. Additionally, the orifice 1357 provides means for flow to bypass the fixed orifice 1362 as fluid flows between the simulation chamber 1354 and the reservoir. The total damping restriction is increased by a desired amount relative to pedal travel and input piston travel as this parallel path is closed. However, this additional or secondary damping provides progressive damping in that the amount of damping is increased with an increase in pedal travel because the orifice 1357 is being choked off by the sloping sides of the frustoconical surface 1352. As the input piston 1306 continues to move rightward as viewing FIG. 16, the frustoconical surface 1352 becomes closer to the opening of the orifice 1357, thereby further restricting the flow of fluid therethrough. The sizes and dimensions of the orifice 1357 and the frustoconical surface 1352 may be tuned or configured to provide a desired progressive damping profile.

Figure 17:
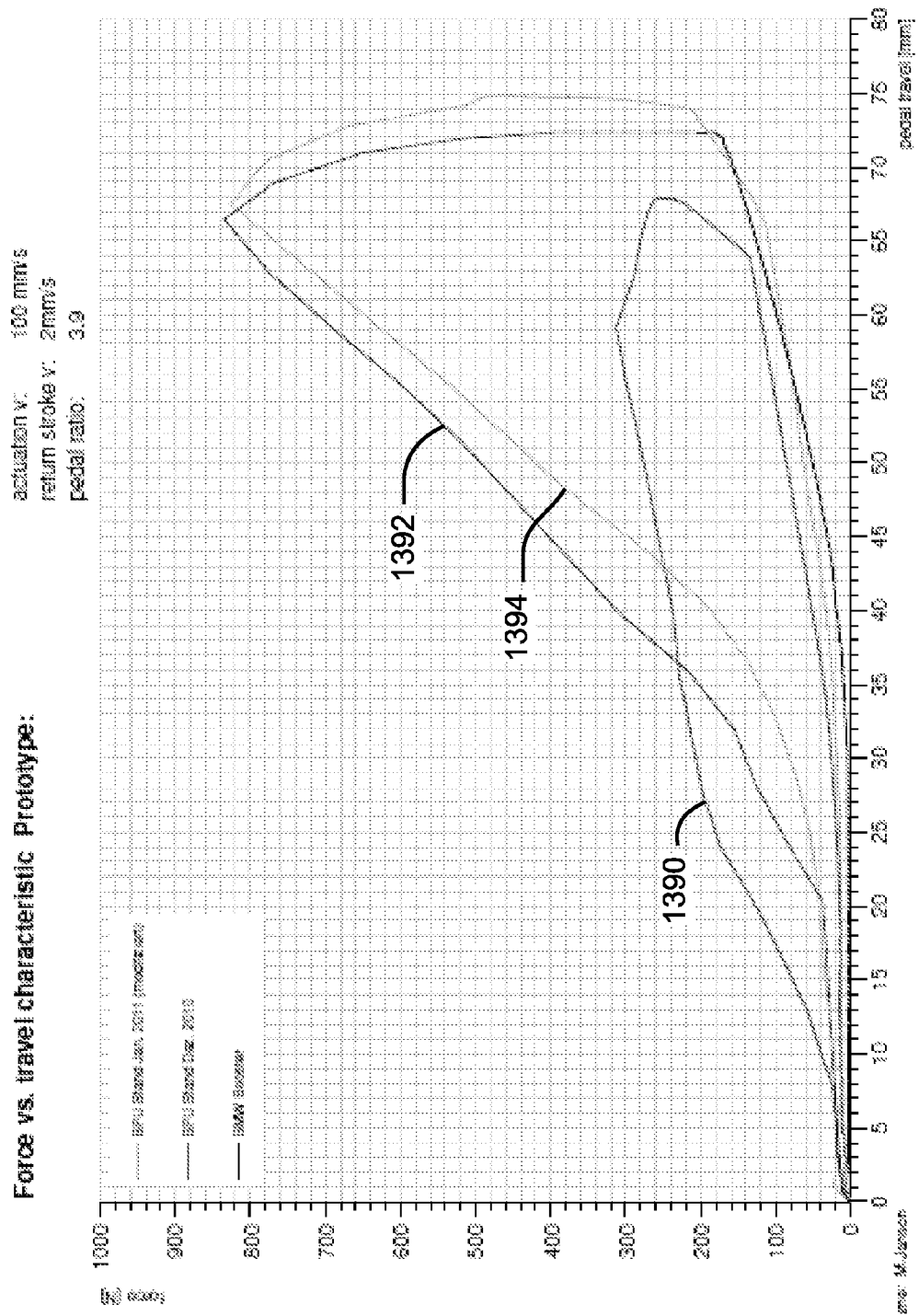
FIG. 17 is a graphical representation of hysteresis within a pedal simulator having progressive damping during a relatively fast apply.

There is illustrated in FIG. 17 a graphical representation of an example of hysteresis within a pedal simulator having progressive damping during a relatively fast apply. The horizontal axis relates to the pedal travel, such as the travel experienced by the brake pedal as the driver presses on the brake pedal. The vertical axis relates to the pedal force acting back on the brake pedal during the length of travel of the brake pedal. Lines 1390 represent a pedal feeling force of a fixed orifice pedal simulator damper during a spike apply having no progressive damping feature. Lines 1392 represent a conventional brake system having a vacuum booster. Lines 1394 represent a pedal feeling force of a pedal simulator during a spike apply having a progressive damping feature, such as the cooperation of the frustoconical surface 1352 and choked orifice 1357 described above.

Figure 18:
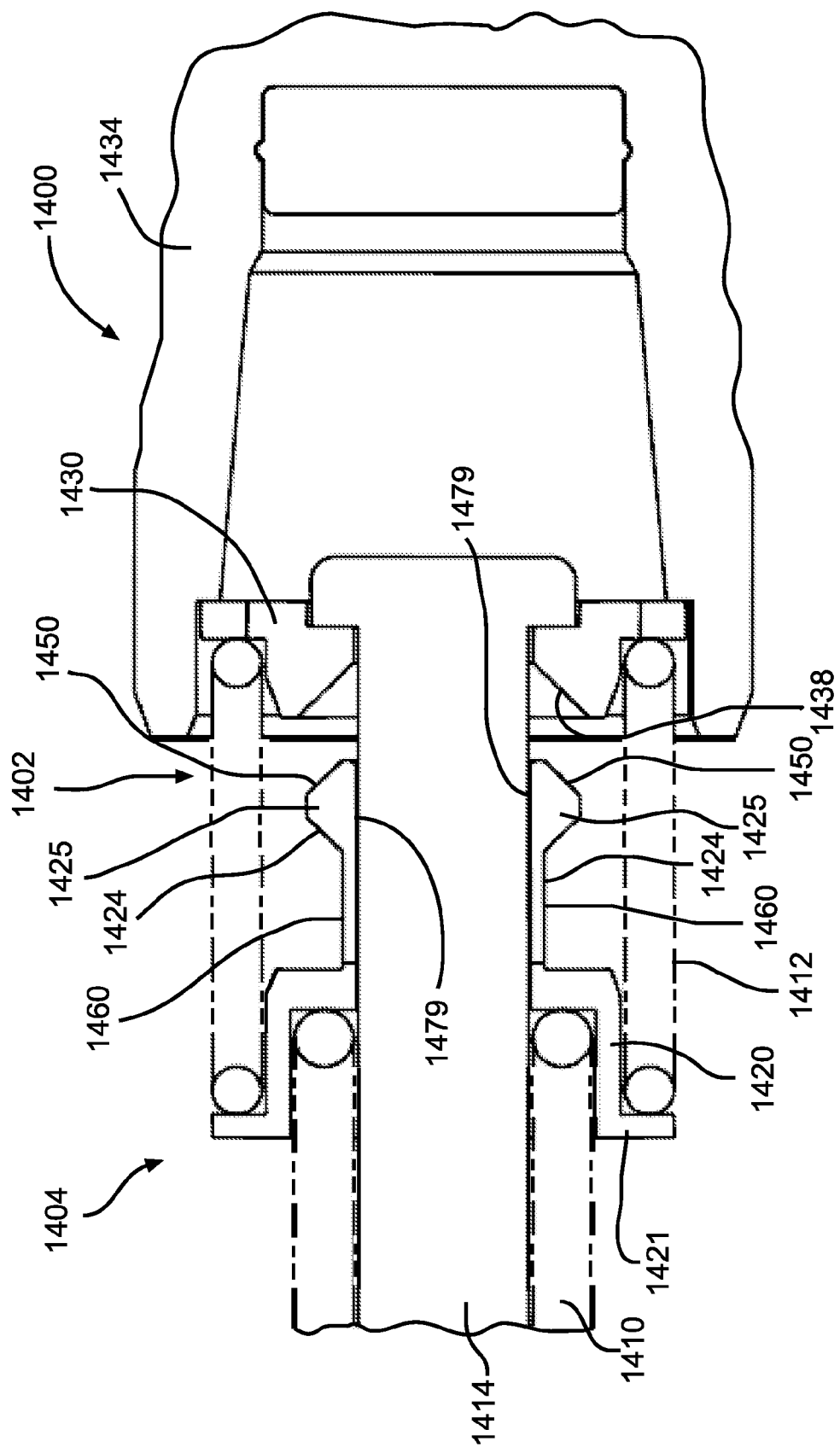
FIG. 18 is a schematic cross-sectional view of a portion of a brake pedal unit illustrating a force hysteresis feature.

There is illustrated in FIG. 18 a portion of a brake pedal unit 1400 illustrating another example of a force hysteresis feature in the form of a wedge mechanism, indicated generally at 1402. The brake pedal unit 1400 includes a pedal simulator, indicated generally at 1404, having springs 1410 and 1412. An input piston (not shown) includes a pin 1414 extending therefrom. A slider 1420 is disposed about the outer cylindrical surface of the pin 1414. The slider 1420 includes a cup-shaped base 1421 which engages the springs 1410 and 1412. Extending from the base 1421 are a plurality contact members or arms 1424 which are oriented circumferentially about the pin 1414. An end of the spring 1412 engages with a washer 1430 which is mounted or engaged with a primary piston 1434. The spring 1412 extends between the washer 1430 and the base 1421 of the slider 1420. The washer 1430 includes a conical surface 1438 which engages with sloped surfaces 1450 formed on each of the ends 1425 of the plurality of arms 1424. The surfaces 1438 and 1450 may have the same slope or angle relative to the axis of the pin. Alternatively, the sloped surfaces 1450 may have a rounded shape as opposed to a collective conical shape. Each of the plurality of arms 1424 includes a relatively thin connector 1460 which connects the ends 1425 to the base 1421. The slider may be made of any suitable material, such as metal or plastic, such that connectors may slight deflect radially inwardly during operation of the wedge mechanism 1420.

During actuation of the pedal simulator 1404, the pin 1414 of the input piston advances towards the primary piston 1434. During this movement, the springs 1410 and 1412 are compressed which also causes the slider 1424 to slide along the pin 1414 and move in a direction towards the washer 1430. Note that the slider 1424 can be configured such that a relatively low friction force is created against the outer cylindrical surface of the pin during travel of the slider 1424 towards the washer 1430. Further movement of the pin 1414 and slider 1424 will eventually cause engagement of the surfaces 1438 and 1450. After engagement of the surfaces 1438 and 1450, the pin 1414 will continue to advance towards the primary piston 1434. Due to increasing forces from the springs 1410 and 1412, each of the ends 1425 of the arms 1425 have contact surfaces 1479 that are forced against the outer cylindrical surface of the pin 1414 in an increasing manner as the pin advances towards the primary piston 1434. The mating of the surfaces 1438 and 1450 force the contact surfaces 1479 radially against surface of the pin 1414. The wedge mechanism 1402 is self-energizing in that the increasing frictional forces between the contact surfaces 1479 and the surface of the pin 1414 cause a further increase build up in frictional force. The friction force increases the normal force non-linearly. Such a force hysteresis caused by the wedge mechanism 1402 is shown in FIG. 15.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A brake pedal unit assembly for coupling to a brake pedal comprising:
   a housing;
   a pedal simulator housed within a simulation chamber formed in said housing, said pedal simulator including a spring for providing force feedback;
   a force hysteresis mechanism generating an external friction component that provides a lag in the output force of said spring of said pedal simulator during an apply and return of said input piston during a normal braking mode;
   a first piston mounted in said housing, wherein said first piston is operable to generate brake actuating pressure at a first pressure output;
   a second piston mounted in said housing, wherein said second piston is operable to generate brake actuating pressure at a second pressure output; and
   an input piston connected to operate said pedal simulator during a normal braking mode, and wherein said input piston is coupled to actuate the first and second pistons during a manual push-though mode.

2. The assembly of claim 1, wherein said simulation chamber is non-pressurized during the manual push-through mode.

3. The assembly of claim 1 further including an input piston slidably disposed in said housing and actuating said pedal assembly during the normal brake apply and actuating first and second input pistons during manual push-through mode.

4. The assembly of claim 3, wherein said input piston and first and second pistons are arranged in a co-axial arrangement such that said first piston is disposed between said input piston and said second piston, and wherein said input piston travels at a higher rate than said first piston during a manual push-though mode.

5. The assembly of claim 4, wherein said input piston has a smaller effective diameter than the effective diameter of the first piston.

6. The assembly of claim 3, wherein the first and second pistons are disposed in a stepped bore formed in the housing such that a first portion of the bore has a larger diameter than a second portion of the bore, and wherein said first piston is disposed in the first portion of the bore, and said second piston is disposed in the second portion of the bore.

7. The assembly of claim 6, wherein a first pressure chamber is defined at least partially by an annular area between an inner cylindrical wall of the first portion of the bore and an outer cylindrical surface of said second piston.

8. The assembly of claim 1, wherein said brake pedal unit assembly includes a progressive damping feature.

9. The assembly of claim 1, wherein said force hysteresis mechanism includes a member engaging said input piston to provide a progressive rate of friction between said input piston and said member as said input piston travels in said housing.

10. The assembly of claim 1, wherein said force hysteresis mechanism includes a washer member which is frictionally engageable with an inner wall of a recess formed in an elastomeric member.

11. The assembly of claim 1, wherein said force hysteresis mechanism includes a contact member forced against an outer cylindrical surface of a portion of said input piston.

12. The assembly of claim 11, wherein said contact member is a quad ring.

13. The assembly of claim 11, wherein said contact member includes a sloped surface engaging with a sloped surface fixed relative to said first piston.

14. The assembly of claim 11, wherein said contact member is self-energizing.

15. A brake system comprising:
   a wheel brake;
   a pressure source supplying fluid at a controlled boost pressure to a boost conduit;
   a control valve directing fluid from said boost conduit to said wheel brake; and
   a brake pedal unit assembly for coupling to a brake pedal comprising:
   a housing;
   a pedal simulator housed within a simulation chamber formed in said housing, said pedal simulator including a spring for providing force feedback;
   a first piston mounted in said housing, wherein said first piston is operable to generate brake actuating pressure at a first pressure output;
   a second piston mounted in said housing, wherein said second piston is operable to generate brake actuating pressure at a second pressure output; and
   an input piston connected to operate said pedal simulator during a normal braking mode, and wherein said input piston is coupled to actuate the first and second pistons during a manual push-though mode; and
   an intensifier for selectively providing an increased amount of fluid into the boost conduit.

16. The assembly of claim 15, wherein said pressure source is a pump having five separate reciprocating pistons.

17. The assembly of claim 15, wherein said pistons are arranged in a housing such that they extend radially from a common axis point and are offset from one another by about 72 degrees.

18. The assembly of claim 15, wherein said pressure source is a plunger assembly.

* * * * *